United States Patent
Muruganathan et al.

(10) Patent No.: US 11,368,915 B2
(45) Date of Patent: Jun. 21, 2022

(54) SYSTEMS AND METHODS FOR FAST UPLINK POWER CONTROL

(71) Applicant: Telefonaktiebolaget LM Ericsson (publ), Stockholm (SE)

(72) Inventors: Siva Muruganathan, Stittsville (CA); Shiwei Gao, Nepean (CA); Xingqin Lin, Santa Clara, CA (US); Vijaya Yajnanarayana, Bangalore (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 71 days.

(21) Appl. No.: 16/754,857

(22) PCT Filed: Oct. 8, 2018

(86) PCT No.: PCT/IB2018/057785
§ 371 (c)(1),
(2) Date: Apr. 9, 2020

(87) PCT Pub. No.: WO2019/073359
PCT Pub. Date: Apr. 18, 2019

(65) Prior Publication Data
US 2021/0289445 A1 Sep. 16, 2021

Related U.S. Application Data

(60) Provisional application No. 62/569,939, filed on Oct. 9, 2017.

(51) Int. Cl.
*H04W 52/04* (2009.01)
*H04W 52/14* (2009.01)
(Continued)

(52) U.S. Cl.
CPC ......... *H04W 52/146* (2013.01); *H04W 52/08* (2013.01); *H04W 52/242* (2013.01); *H04W 52/245* (2013.01); *H04W 52/367* (2013.01)

(58) Field of Classification Search
CPC ... H04W 52/362; H04W 52/18; H04W 52/58; H04W 52/221; H04W 72/04; H04W 52/04; H04W 28/14
See application file for complete search history.

(56) References Cited

U.S. PATENT DOCUMENTS

2012/0087334 A1* 4/2012 Suzuki .................. H04L 5/0091
370/329
2021/0084597 A1* 3/2021 Han ..................... H04W 52/146

FOREIGN PATENT DOCUMENTS

EP 2779760 A1 9/2014
WO 2019064273 A1 4/2019

OTHER PUBLICATIONS

Author Unknown, "Technical Specification Group Radio Access Network; Study on Enhanced LTE Support for Aerial Vehicles (Release 15)," 3GPP Technical Report (TR) 36.777, Version 0.3.0, Sep. 2017, 3GPP Organizational Partners, 23 pages.
(Continued)

*Primary Examiner* — Tu X Nguyen
(74) *Attorney, Agent, or Firm* — Withrow & Terranova, PLLC

(57) ABSTRACT

Systems and methods are disclosed herein for fast uplink power control. In some embodiments, a method performed by a wireless device for fast uplink power control comprises receiving a transmit power control command from a network node and determining one of two or more predefined transmit power control mapping tables to be used by the wireless device to interpret the transmit power control command. The method further comprises determining a power adjustment value based on the transmit power control command received from the network node using the one of the two or more predefined transmit power control mapping tables and adjusting a transmit power of the wireless device based on the power adjustment value. In this manner, different transmit power control mapping tables can be used in different scenarios, which allows fast uplink power control.

36 Claims, 16 Drawing Sheets

(51) Int. Cl.
　　　*H04W 52/08*　　(2009.01)
　　　*H04W 52/24*　　(2009.01)
　　　*H04W 52/36*　　(2009.01)

(56) References Cited

OTHER PUBLICATIONS

Author Unknown, "Technical Specification Group Radio Access Network; Evolved Universal Terrestrial Radio Access (E-UTRA); Physical layer procedures (Release 14)," 3GPP Technical Specification (TS) 36.213, Version 14.3.0, Jun. 2017, 3GPP Organizational Partners, 460 pages.

Huawei, et al., "R1-1806894: PUCCH design for URLLC," Third Generation Partnership Project (3GPP), TSG RAN WG1 Meeting #93, May 21-25, 2018, 2 pages, Busan, Korea.

NTT Docomo, "R1-1713889: Initial views on interference mitigation schemes for aerials," Third Generation Partnership Project (3GPP), TSG RAN WG1 Meeting #90, Aug. 21-25, 2017, 3 pages, Prague, Czechia.

NTT Docomo, "R1-1718174: Views on interference mitigation schemes for aerials," Third Generation Partnership Project (3GPP), TSG RAN WG1 Meeting 90bis, Oct. 9-13, 2017, 4 pages, Prague, CZ.

Qualcomm Incorporated, "R1-1708813: System level performance and interference mitigation techniques for aerials vehicles," Third Generation Partnership Project (3GPP), TSG RAN WG1 Meeting #89, May 15-19, 2017, 5 pages, Hangzhou, P.R. China.

ZTE, "R1-1714466: Potential enhancements on interference mitigation," Third Generation Partnership Project (3GPP), TSG RAN WG1 Meeting #90, Aug. 21-25, 2017, 5 pages, Prague, Czechia.

International Search Report and Written Opinion for International Patent Application No. PCT/IB2018/057785, dated Dec. 12, 2018, 16 pages.

Examination Report for European Patent Application No. 18796113.1, dated Oct. 6, 2021, 5 pages.

* cited by examiner

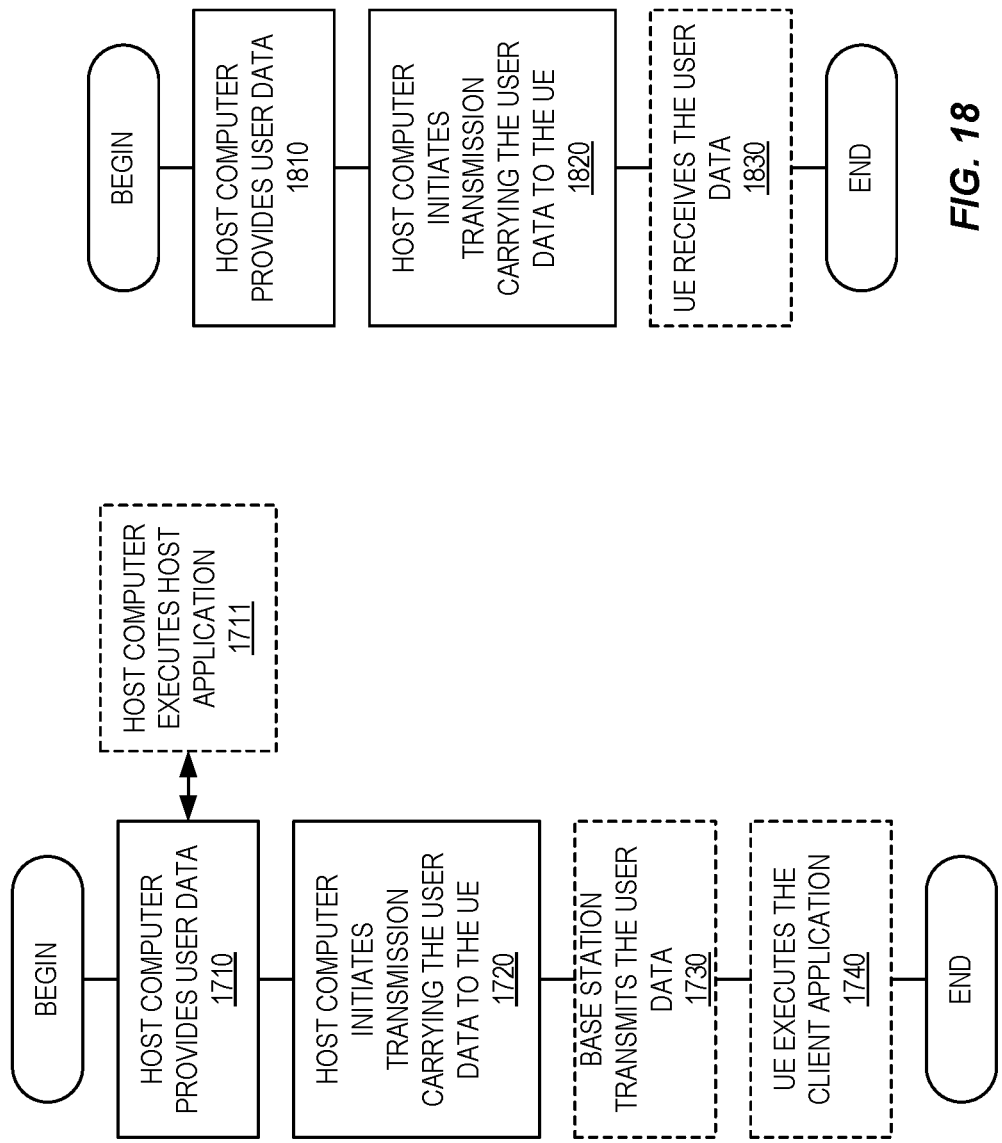

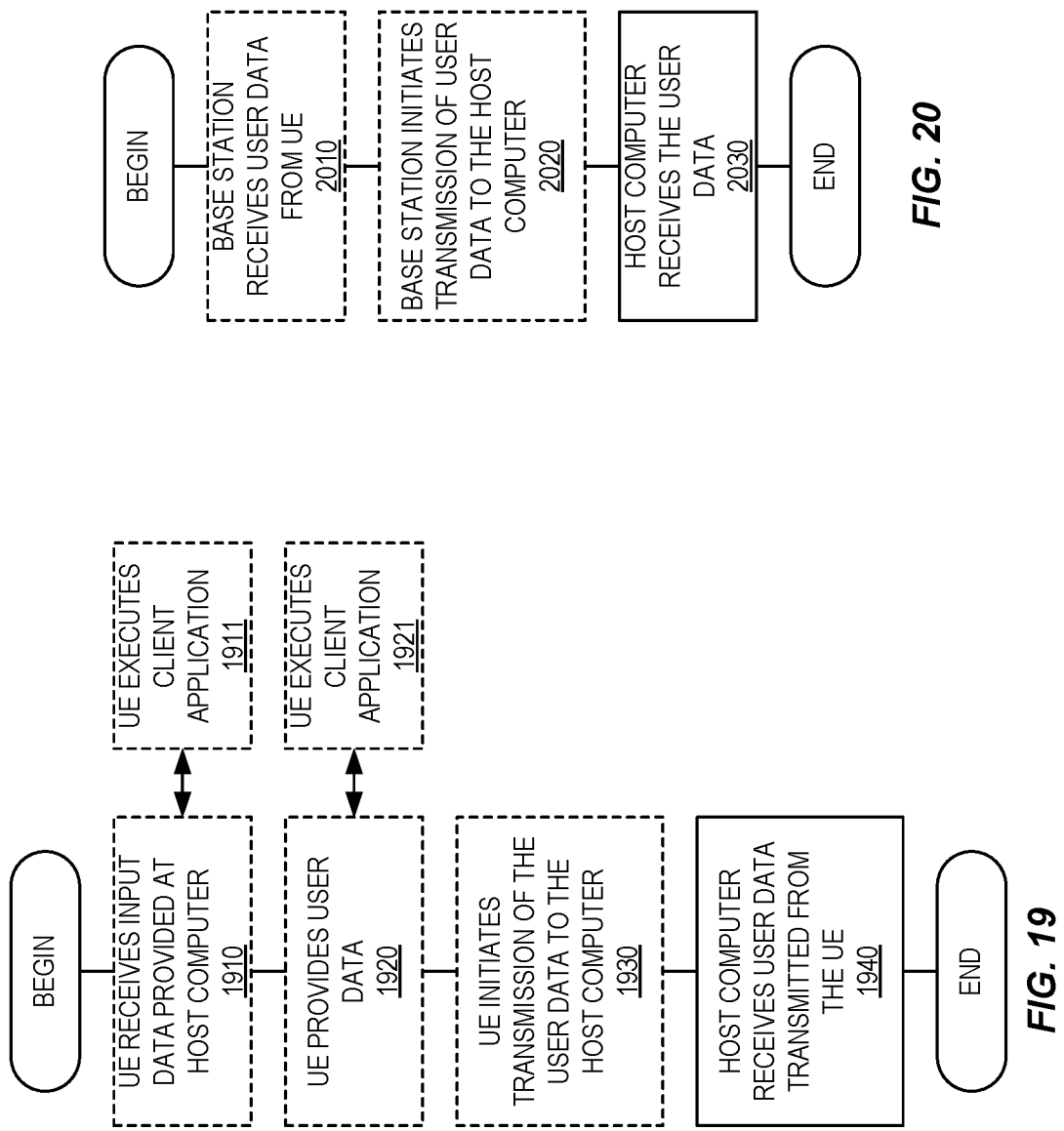

SYSTEMS AND METHODS FOR FAST UPLINK POWER CONTROL

RELATED APPLICATIONS

This application is a 35 U.S.C. § 371 national phase filing of International Application No. PCT/IB2018/057785, filed Oct. 8, 2018, which claims the benefit of provisional patent application Ser. No. 62/569,939, filed Oct. 9, 2017, the disclosures of which are hereby incorporated herein by reference in their entireties.

TECHNICAL FIELD

The present disclosure relates to uplink power control in a cellular communications network.

BACKGROUND

Long Term Evolution (LTE) Downlink and Uplink

LTE uses Orthogonal Frequency Division Multiplexing (OFDM) in the downlink and Discrete Fourier Transform (DFT)-spread OFDM in the uplink. The basic LTE downlink physical resource can thus be seen as a time-frequency grid as illustrated in FIG. 1, where each resource element corresponds to one OFDM subcarrier during one OFDM symbol interval.

In the time domain, LTE downlink transmissions are organized into radio frames of 10 milliseconds (ms), each radio frame consisting of ten equally-sized subframes of length $T_{subframe}=1$ ms, as shown in FIG. 2, which illustrates the LTE time-domain structure.

Furthermore, the resource allocation in LTE is typically described in terms of Resource Blocks (RBs), where a resource block corresponds to one slot (0.5 ms) in the time domain and 12 contiguous subcarriers in the frequency domain. Resource blocks are numbered in the frequency domain, starting with 0 from one end of the system bandwidth.

Downlink transmissions are dynamically scheduled, i.e., in each subframe the enhanced or evolved Node B (eNB) transmits control information about to which User Equipment device (UE) data is transmitted and upon which resource blocks the data is transmitted, in the current downlink subframe. This control signaling is typically transmitted in the first 1, 2, 3, or 4 OFDM symbols in each subframe. A downlink system with 3 OFDM symbols as control is illustrated in FIG. 3.

In LTE, a number of physical channels are supported. The following are some of the physical channels supported in LTE:
  Physical Downlink Shared Channel (PDSCH),
  Physical Downlink Control Channel (PDCCH),
  Enhanced Physical Downlink Control Channel (EPDCCH),
  Physical Uplink Shared Channel (PUSCH), and
  Physical Uplink Control Channel (PUCCH).

PDSCH is used mainly for carrying user traffic data and higher layer messages. PDSCH is transmitted in a downlink subframe outside of the control region, as shown in FIG. 3. Both PDCCH and EPDCCH are used to carry Downlink Control Information (DCI). PDCCH is transmitted in the control region in a downlink subframe, while EPDCCH is transmitted in the same region as PDSCH. PUSCH is used for carrying user data and/or Uplink Control Information (UCI) in the uplink while PUCCH is used for carrying UCI only in the uplink.

LTE uses Hybrid Automatic Repeat Request (HARQ), where, after receiving downlink data in a subframe, the UE attempts to decode it and reports to the eNB whether the decoding was successful (Acknowledgement (ACK)) or not (Negative Acknowledgement (NACK)). In case of an unsuccessful decoding attempt, the eNB can retransmit the erroneous data.

Uplink control signaling from the UE to the eNB consists of:
  HARQ acknowledgements for received downlink data;
  UE reports related to the downlink channel conditions, used as assistance for the downlink scheduling; and
  scheduling requests indicating that a UE needs uplink resources for uplink data transmissions.

If the UE has not been assigned an uplink resource for data transmission, the L1/L2 control information (channel-status information reports, HARQ acknowledgments, and scheduling requests) is transmitted in uplink resources (resource blocks) specifically assigned for uplink L1/L2 control on PUCCH. As illustrated in FIG. 4, these resources are located at the edges of the total available cell bandwidth. Each such resource consists of twelve "subcarriers" (one resource block) within each of the two slots of an uplink subframe. In order to provide frequency diversity, these frequency resources are frequency hopping on the slot boundary, i.e. one "resource" consists of 12 subcarriers at the upper part of the spectrum within the first slot of a subframe and an equally sized resource at the lower part of the spectrum during the second slot of the subframe or vice versa. If more resources are needed for the uplink L1/L2 control signaling, e.g. in case of very large overall transmission bandwidth supporting a large number of users, additional resource blocks can be assigned next to the previously assigned resource blocks.

To transmit data in the uplink, the terminal has to be assigned an uplink resource for data transmission on the PUSCH. FIG. 5 shows an example of PUSCH resource assignment to two users (denoted as User #1 and User #2 in FIG. 5). The middle symbol in each slot is used to transmit a reference symbol. If the UE has been assigned an uplink resource for data transmission and at the same time instance has control information to transmit, it will transmit the control information together with the data on PUSCH.

PDCCH and EPDCCH in LTE

PDCCH and EPDCCH are used to carry DCI such as scheduling decisions and power-control commands. More specifically, the DCI may include:
  Downlink scheduling assignments, including PDSCH resource indication, transport format, HARQ information, and control information related to spatial multiplexing (if applicable). A downlink scheduling assignment also includes a command for power control of the PUCCH used for transmission of HARQ acknowledgements in response to downlink scheduling assignments.
  Uplink scheduling grants, including PUSCH resource indication, transport format, and HARQ-related information. An uplink scheduling grant also includes a command for power control of the PUSCH.
  Power-control commands for a set of terminals as a complement to the commands included in the scheduling assignments/grants.

Different DCI formats are defined in LTE for downlink and uplink. For example, DCI formats 0 and 4 are used for uplink data scheduling while DCI formats 1, 1A, 1B, 1C, 1D, 2, 2A, 2B, 2C, and 2D are used for downlink data scheduling. Different DCI formats are designed for different transmission modes in either downlink or uplink. For example, DCI format 0 is for uplink data transmission with a single transmit antenna at a UE while DCI format 4 is for uplink data transmission with Multiple Input Multiple Output (MIMO) where a UE has more than one transmit antenna. In addition, DCI formats 3 and 3A are dedicated for uplink power control of PUCCH and PUSCH for a group of UEs. With the introduction of License Assisted Access (LAA), Machine Type Communication (MTC), and Narrowband Internet of Things (NB-IoT) in LTE, additional DCI formats have been added. For example, DCI formats 0A, 0B, 0C, 4A, 4B, 6-0A, and 6-0B are introduced for uplink data scheduling.

Each DCI typically contains multiple bit fields. The exact fields vary from one DCI format to another. Some common bit fields include:
Resource allocation;
Modulation and coding scheme and redundancy version; and
Transmit Power Control (TPC) command for PUSCH (in uplink related DCIs, e.g. DCI formats 0 and 4) or PUCCH (in downlink related DCIs, e.g. DCI formats 1 and 2).

One PDCCH/EPDCCH carries one DCI message with one of the formats above. As multiple UEs can be scheduled simultaneously on both downlink and uplink, there must be a possibility to transmit multiple scheduling messages within each subframe. Each scheduling message is transmitted on separate PDCCH/EPDCCH resources, and consequently there are typically multiple simultaneous PDCCH/EPDCCH transmissions within each cell. Furthermore, to support different radio-channel conditions, link adaptation can be used, where the code rate of the PDCCH/EPDCCH is selected by adapting the resource usage for the PDCCH/EPDCCH to match the radio-channel conditions.

Interference Caused by Aerial UEs in LTE Networks

UEs attached to drones or other aerial vehicles flying in the sky can cause uplink interference in neighbor cells due to high probability of Line of Sight (LOS) condition to neighbor cells. When such UEs transmit signals to a serving eNB or network node, the signals will also reach neighbor eNBs with a comparable level of received signal power, which can cause interference to UEs being served by the neighbor cells. An example is shown in FIG. 6, where UE 3 on a drone is served by eNB 3 and can cause interference to eNB 1 which is receiving an uplink signal from UE 1 and also cause interference to eNB 2 which is receiving an uplink signal from UE 2 in neighbor cells. Note that even though the example in FIG. 6 shows UE 3 on a drone, the interference issue described in the example is also present in case UE 3 itself is a drone UE. In the following discussion, "UE on a drone", "UE attached to an drone", "drone UE", and "aerial UE" are used interchangeably.

Such uplink interference needs to be controlled (i.e., mitigated) in order to enable services to UEs attached to drones or drone UEs in existing cellular networks.

A number of solutions have been proposed in a Third Generation Partnership Project (3GPP) study on serving aerial vehicles by existing terrestrial LTE networks. Most of the solutions are related to uplink power control.

Uplink Power Control in LTE

In LTE, one of the power control methods for PUSCH on a serving carrier, c, is given by the formula below in Equation (Eq.) 1 [2]. Note that the formula in Equation 1 is applicable when the UE does not transmit other channels, such as PUCCH, with PUSCH in subframe i'. Note that, although embodiments of the present disclosure described herein are described for the case when the UE does not transmit other channels with PUSCH in subframe i', the embodiments can be easily extended to cases when the UE transmits other channels (such as PUCCH) with PUSCH.

$$P_{PUSCH,c}(i') = \min\left\{\begin{array}{l} P_{CMAX,c}(i'), \\ 10\log_{10}(M_{PUSCH,c}(i')) + P_{O\_PUSCH,c} + \\ \alpha_c \cdot PL_c + \Delta_{TF,c}(i') + f_c(i') \end{array}\right\} \quad \text{Eq. 1}$$

where
$P_{CMAX,c}(i')$ is the configured maximum UE transmit power in decibels (dB) with reference to 1 milliwatt (mW) (dBm).
$M_{PUSCH,c}(i')$ is the bandwidth of the PUSCH resource assignment expressed in number of resource blocks valid for subframe i' and serving cell c.
$P_{O\_PUSCH,c}$ is an open loop power control parameter in dBm composed of the sum of a cell specific component $P_{O\_NOMINAL\_PUSCH,c}$ and a UE specific component $P_{O\_UE\_PUSCH,c}$ for serving cell c.
$\alpha_c \in \{0, 0.4, 0.5, 0.6, 0.7, 0.8, 0.9, 1\}$ is a fractional pathloss compensation power control parameter for serving cell c.
$PL_c$ is the downlink pathloss estimate calculated in the UE for serving cell c in dB and $PL_c$=referenceSignalPower−higher layer filtered Reference Signal Received Power (RSRP), where referenceSignalPower is provided by higher layers and RSRP is the reference signal received power at the UE for the serving cell.
$\Delta_{TF,c}(i')$ is an offset which can be used to ensure that the received Signal to Interference plus Noise Ratio (SINR) matches the SINR required for a given Modulation and Coding Scheme (MCS, that is the PUSCH data rate) selected by the eNB. It is also possible to set $\Delta_{TF,c}(i')$ to zero in which case the PUSCH received power will be matched to a certain MCS given by the value of $P_{O\_PUSCH,c}$ selected by the eNB.
$f_c(i')=f_c(i'-1)+\delta_{PUSCH,c}(i'-K_{PUSCH})$ is the current PUSCH power control adjustment state for serving cell c if accumulation is enabled and $f_c(i')=\delta_{PUSCH,c}(i'-K_{PUSCH})$ if accumulation is not enabled.
$\delta_{PUSCH,c}(i'-K_{PUSCH})$ is a correction value (also referred to herein as a power adjustment value), also referred to as a TPC command, signaled to the UE in the downlink control channel at subframe $i'-K_{PUSCH}$. $K_{PUSCH}$ is a delay in subframes to apply a power correction when a TPC command is received at subframe i', $K_{PUSCH}$ equals 4 for Frequency Division Duplex (FDD) systems. For Time Division Duplex (TDD) systems, the values of $K_{PUSCH}$ are given in Section 5.1.1.1 of Technical Specification (TS) 36.213 [2].

The above power control consists two parts, i.e. an open loop part, $10\log_{10}(M_{PUSCH,c}(i'))+P_{O\_PUSCH,c}+\alpha_c \cdot PL_c+$ $\Delta_{TF,c}(i')$, and a closed loop part, $f_c(i')$. The open loop part is used by a UE to estimate the approximate transmit power based on the pathloss estimation $PL_c$, the allocated PUSCH bandwidth $M_{PUSCH,c}(i')$, the modulation and coding rate, $\Delta_{TF,c}(i')$, and the target receive power $P_{O\_PUSCH,c}$ per resource block. The closed loop power control is used to fine tune the UE transmit power based on the target received signal power $P_{O\_PUSCH,c}$ and the actual received PUSCH power at the network node. The close loop power control is done by sending UE a TPC command by the eNB, requesting the UE to adjust its transmit power. Note that $P_{O\_PUSCH,c}$ is a target received power per RB at a certain MCS. It is adjusted when more than one RB is scheduled and/or at a different MCS, i.e. by the amount of $M_{PUSCH,c}(i')+\Delta_{TF,c}(i')$.

In LTE, the TPC command can be present as a 2-bit field in DCI formats 0/0A/0B/3/4A/4B/6-0A/3B. Note that for notational convenience, $\delta_{PUSCH,c}(i'-K_{PUSCH})$ will henceforth be simply referred to as $\delta_{PUSCH,c}$. The allowed values of $\delta_{PUSCH,c}$ for a 2-bit TPC command field in DCI formats 0/0A/0B/3/4A/4B/6-0A/3B are given in Table 5.1.1.1-2 of TS 36.213 [2]. The table is reproduced below in Table 1. As can be seen in Table 1, when accumulation is enabled, the signaled $\delta_{PUSCH,c}$ value in the TPC command can have one of the values of −1, 0, 1, or 3. When accumulation is disabled, the signaled $\delta_{PUSCH,c}$ value in the TPC command can have one of the values of −4, −1, 1, or 4.

TABLE 1

Mapping of TPC Command Field in DCI format 0/0A/0B/3/4/4A/
4B/6-0A/3B to absolute and accumulated $\delta_{PUSCH,c}$ values

| TPC Command Field in DCI format 0/0A/0B/3/4/4A/4B/6-0A/3B | Accumulated $\delta_{PUSCH,c}$ [dB] | Absolute $\delta_{PUSCH,c}$ [dB] only DCI format 0/0A/0B/4/4A/4B/6-0A |
|---|---|---|
| 0 | −1 | −4 |
| 1 | 0 | −1 |
| 2 | 1 | 1 |
| 3 | 3 | 4 |

In LTE, the TPC command can also be present as a 1-bit field in DCI formats 3A/3B. The allowed values of $\delta_{PUSCH,c}$ for a 1-bit TPC command field in DCI formats 3A/3B are given in Table 5.1.1.1-2 of TS 36.213 [2]. The table is reproduced below in Table 2. As can be seen in Table 2, when accumulation is enabled, the signaled $\delta_{PUSCH,c}$ value in the TPC command can have one of the values of −1 or 1.

TABLE 2

Mapping of TPC Command Field in DCI format
3A/3B to accumulated $\delta_{PUSCH,c}$ values

| TPC Command Field in DCI format | Accumulated $\delta_{PUSCH,c}$ [dB] 3A/3B |
|---|---|
| 0 | −1 |
| 1 | 1 |

Other uplink power control methods including PUCCH and Sounding Reference Signal (SRS) power control can be found in Section 5 in TS 36.213 [2], and Physical Random Access Channel (PRACH) power control can be found in Section 6.1 in TS 36.213 [3]. Although PUSCH is used as an example in the following discussions, the principle is also applicable to PUCCH and SRS.

The fractional power control factor $\alpha_c$ in Equation 1 and the pathloss calculation (PL) are related to open loop power control. FIG. 7 is an illustration of initial PUSCH transmit power (shown on bottom left) and TPC command based adjustments to reach a target PUSCH transmit power setting (shown on top right) in a UE. The one or more TPCs are sent to the UE by the eNB via the downlink control channel using one of the DCI formats discussed above. As shown in FIG. 7 (where $\Delta_{TF,c}(i')$ is assumed to be zero), the $\alpha_c$ parameter along with $P_{O\_PUSCH,c}$ are used to control the initial UE transmit power. Note that in FIG. 7 that initial transmit power for PUSCH is shown in the bottom left and also includes the term involving the bandwidth $M_{PUSCH,c}(i')$ of the PUSCH resource assignment. While closed-loop is enabled, the transmit power of a UE will be adjusted by the eNB so that a target received power is achieved at the eNB.

In one example, the target transmit power $P_{Target,PUSCH,c}$ per RB that in FIG. 7 is chosen such that the target received power per RB is equal to $P_{O\_PUSCH,c}$. Hence, the one or more TPC commands shown in FIG. 7 are sent to the UE by the eNB to adjust $P_{Target,PUSCH,c}$ at the UE so that the target received power of $P_{O\_PUSCH,c}$ is reached at the eNB. Eventually after convergence, the UE's transmit power will be determined by the target received power setting and the actual serving cell pathloss. That is, $P_{Target,PUSCH,c}=P_{O\_PUSCH,c}+PL_c$ after convergence. For the same bandwidth of the PUSCH resource assignment at subframes i' and i" (that is, $M_{PUSCH,c}(i')=M_{PUSCH,c}(i")$), then the total adjustment required for this case is given by Equation 2, assuming $PL_c$ is the actual pathloss to the serving cell.

$$\text{total adjustment}=(1-\alpha_c)\cdot PL_c \qquad \text{Eq. 2}$$

Existing Solutions for Controlling/Mitigating
Interference Caused by Aerial UEs

In the Release-15 3GPP study item on 'Enhanced LTE support for Aerial Vehicles', three different Aerial vehicle scenarios were agreed [1], namely:
Urban Micro for Aerial Vehicles (UMi-AV),
Urban Macro for Aerial Vehicles (UMa-AV), and
Rural Macro for Aerial Vehicles (RMa-AV).
The pathlosses to the serving cell (i.e., $PL_c$) associated with these three scenarios where a mixture of both terrestrial UEs and aerial UEs are deployed are given in 3GPP Technical Report (TR) 36.777 [1]. The values ($PL_c$) corresponding to UMi-AV, UMa-AV, and RMa-AV are given in FIGS. C-1, C-3, and C-5, respectively in [1], where the scenarios with both aerial vehicles and terrestrial vehicles deployed are denoted as 'Case 5' in the figures within [1]. FIG. 8 shows the cumulative distribution function of the total adjustments needed for closed loop power control (i.e., in Equation 2) for the three scenarios when the fractional pathloss compensation power control parameter $\alpha_c=0.8$.

In addition to existing closed loop power control mechanism in LTE, other solutions are also proposed in [4] and [5]. In [4] and [5], uplink power control with UE specific fractional pathloss compensation power control factor, $\alpha_c$, and UE specific transmit power $P_{CMAX,c}(i')$ for aerial UEs were proposed. In [7], a method of dynamically adjusting the target receive power for aerial UEs based on both serving and neighbor cell RSRPs or pathlosses were proposed to mitigate uplink interference caused by the aerial UEs.

However, there remains a need for uplink power control solutions that, e.g., control/mitigate interference caused by aerial UEs.

SUMMARY

Systems and methods are disclosed herein for fast uplink power control. In some embodiments, a method performed by a wireless device for fast uplink power control comprises receiving a transmit power control command from a network node and determining one of two or more predefined transmit power control mapping tables to be used by the wireless device to interpret the transmit power control command. The method further comprises determining a power adjustment value based on the transmit power control command received from the network node using the one of the two or more predefined transmit power control mapping tables and adjusting a transmit power of the wireless device based on the power adjustment value. In this manner, different transmit power control mapping tables can be used in different scenarios, which allows fast uplink power control through a reduction in the number of needed transmit power control commands needed to converge to a desired receive power at the network node.

In some embodiments, the method further comprises transmitting an uplink transmission using the adjusted transmit power.

In some embodiments, the method further comprises receiving, from the network node, an indication of the one of two or more predefined transmit power control mapping tables to be used by the wireless device. Determining the one of two or more predefined transmit power control mapping tables to be used by the wireless device comprises determining the one of two or more predefined transmit power control mapping tables to be used by the wireless device based on the indication received from the network node.

In some embodiments, determining the one of two or more predefined transmit power control mapping tables to be used by the wireless device comprises determining, at the wireless device, the one of two or more predefined transmit power control mapping tables to be used by the wireless device based on one or more predefined criteria. In some embodiments, the one or more predefined criteria comprise a criterion related to a height of the wireless device. In some embodiments, the one or more predefined criteria comprise a criterion based on: a Reference Signal Received Power (RSRP) of a serving cell of the wireless device and a RSRP of one or more neighboring cells of the wireless device, and/or Reference Signal Received Quality (RSRQ), and/or Received Signal Strength Indicator (RSSI).

In some embodiments, the method further comprises receiving one or more criteria from the network node. Determining the one of two or more predefined transmit power control mapping tables to be used by the wireless device comprises determining the one of two or more predefined transmit power control mapping tables to be used by the wireless device based on the one or more criteria received from the network node.

In some embodiments, the two or more predefined transmit power control mapping tables comprise a first transmit power control mapping table and a second transmit power control mapping table that is different than the first transmit power control mapping table. In some embodiments, the first transmit power control mapping table is an existing table defined in Third Generation Partnership Project (3GPP) Long Term Evolution (LTE) and the second transmit power control mapping table is a new table.

In some embodiments, the first transmit power control mapping table and the second transmit power control mapping table have a same number of entries. In some embodiments, the first transmit power control mapping table has four entries corresponding to four different power adjustment values defined by the first transmit power control mapping table, and the second transmit power control mapping table has four entries corresponding to four different power adjustment values defined by the second transmit power control mapping table, at least one of which is greater than all of the four power adjustment values defined by the first transmit power control mapping table. In some embodiments, the first transmit power control mapping table has four entries corresponding to four different power adjustment values defined by the first transmit power control mapping table, and the second transmit power control mapping table has four entries corresponding to four different power adjustment values defined by the second transmit power control mapping table, at least one of which is less than all of the four power adjustment values defined by the first transmit power control mapping table.

In some embodiments, the first transmit power control mapping table has a first number of entries and the second transmit power control mapping table has a second number of entries that is not equal to the first number of entries. In some embodiments, the first transmit power control mapping table has four entries corresponding to four different power adjustment values defined by the first transmit power control mapping table, and the second transmit power control mapping table has eight entries corresponding to eight different power adjustment values defined by the second transmit power control mapping table, at least one of which is greater than all of the four power adjustment values defined by the first transmit power control mapping table. In some embodiments, the first transmit power control mapping table has four entries corresponding to four different power adjustment values defined by the first transmit power control mapping table, and the second transmit power control mapping table has eight entries corresponding to eight different power adjustment values defined by the second transmit power control mapping table, at least one of which is less than all of the four power adjustment values defined by the first transmit power control mapping table. In some embodiments, the first transmit power control mapping table is a subset of the second transmit power control mapping table.

In some embodiments, the two or more transmit power control mapping tables define accumulated power adjustment values. In some embodiments, the two or more transmit power control mapping tables define non-accumulated power adjustment values.

In some embodiments, receiving the transmit power control command from the network node comprises receiving, from the network node, downlink control information comprising the transmit power control command. In some embodiments, a pathloss compensation factor is jointly indicated with the power adjustment value using the same field in the downlink control information.

In some embodiments, the method further comprises providing user data, and forwarding the user data to a host computer via a transmission to the network node using the adjusted uplink transmit power.

Embodiments of a wireless device are also disclosed. In some embodiments, a wireless device for fast uplink power control comprises an interface and processing circuitry configured to cause the wireless device to: receive a transmit power control command from a network node; determine one of two or more predefined transmit power control mapping tables to be used by the wireless device to interpret the transmit power control command; determine a power adjustment value based on the transmit power control command received from the network node using the one of the two or more predefined transmit power control mapping tables; and adjust a transmit power of the wireless device based on the power adjustment value.

In some embodiments, a wireless device for fast uplink power control is adapted to receive a transmit power control command from a network node, determine one of two or more predefined transmit power control mapping tables to be used by the wireless device to interpret the transmit power control command, determine a power adjustment value based on the transmit power control command received from the network node using the one of the two or more predefined transmit power control mapping tables, and adjust a transmit power of the wireless device based on the power adjustment value.

Embodiments of a method performed by a network node are also disclosed. In some embodiments, a method performed by a network node to provide fast uplink power control comprises signaling, from the network node to a wireless device either an indication of one of two or more predefined transmit power control mapping tables to be used by the wireless device or one or more criteria to be used by the wireless device to select the one of the two or more predefined mapping tables to be used by the wireless device. The method further comprises sending, from the network node to the wireless device, a transmit power control command to be mapped to a power adjustment value by the wireless device using the one of the two or more predefined transmit power control mapping tables.

In some embodiments, signaling the indication of the one of two or more predefined transmit power control mapping tables to be used by the wireless device or the one or more criteria to be used by the wireless device to select the one of the two or more predefined mapping tables to be used by the wireless device comprises signaling, from the network node to the wireless device, the indication of the one of two or more predefined transmit power control mapping tables to be used by the wireless device.

In some embodiments, signaling the indication of the one of two or more predefined transmit power control mapping tables to be used by the wireless device or the one or more criteria to be used by the wireless device to select the one of the two or more predefined mapping tables to be used by the wireless device comprises signaling, from the network node to the wireless device, the one or more criteria to be used by the wireless device to select the one of the two or more predefined mapping tables.

In some embodiments, the two or more predefined transmit power control mapping tables comprise a first transmit power control mapping table and a second transmit power control mapping table that is different than the first transmit power control mapping table. In some embodiments, the first transmit power control mapping table is an existing table defined in 3GPP LTE and the second transmit power control mapping table is a new table.

In some embodiments, the first transmit power control mapping table and the second transmit power control mapping table have a same number of entries. In some embodiments, the first transmit power control mapping table has four entries corresponding to four different power adjustment values defined by the first transmit power control mapping table, and the second transmit power control mapping table has four entries corresponding to four different power adjustment values defined by the second transmit power control mapping table, at least one of which is greater than all of the four power adjustment values defined by the first transmit power control mapping table. In some embodiments, the first transmit power control mapping table has four entries corresponding to four different power adjustment values defined by the first transmit power control mapping table, and the second transmit power control mapping table has four entries corresponding to four different power adjustment values defined by the second transmit power control mapping table, at least one of which is less than all of the four power adjustment values defined by the first transmit power control mapping table.

In some embodiments, the first transmit power control mapping table has a first number of entries and the second transmit power control mapping table has a second number of entries that is not equal to the first number of entries. In some embodiments, the first transmit power control mapping table has four entries corresponding to four different power adjustment values defined by the first transmit power control mapping table, and the second transmit power control mapping table has eight entries corresponding to eight different power adjustment values defined by the second transmit power control mapping table, at least one of which is greater than all of the four power adjustment values defined by the first transmit power control mapping table. In some embodiments, the first transmit power control mapping table has four entries corresponding to four different power adjustment values defined by the first transmit power control mapping table, and the second transmit power control mapping table has eight entries corresponding to eight different power adjustment values defined by the second transmit power control mapping table, at least one of which is less than all of the four power adjustment values defined by the first transmit power control mapping table. In some embodiments, the first transmit power control mapping table is a subset of the second transmit power control mapping table.

In some embodiments, the two or more predefined transmit power control mapping tables define accumulated power adjustment values. In some embodiments, the two or more predefined transmit power control mapping tables define non-accumulated power adjustment values.

In some embodiments, sending the transmit power control command comprises sending, from the network node to the wireless device, downlink control information comprising the transmit power control command. In some embodiments, a pathloss compensation factor is jointly indicated with the power adjustment value using the same field in the downlink control information.

In some embodiments, the method further comprises obtaining user data, and forwarding the user data to a host computer or a wireless device.

Embodiments of a network node are also disclosed. In some embodiments, a network node for fast uplink power control comprises an interface and processing circuitry configured to cause the network node to: signal, from the network node to a wireless device, either an indication of one of two or more predefined transmit power control mapping tables to be used by the wireless device or one or more criteria to be used by the wireless device to select the one of the two or more predefined mapping tables to be used by the wireless device; and send, from the network node to the wireless device, a transmit power control command to be mapped to a power adjustment value by the wireless device using the one of the two or more predefined transmit power control mapping tables.

In some embodiments, a network node for fast uplink power control is adapted to signal, from the network node to a wireless device, either an indication of one of two or more predefined transmit power control mapping tables to be used by the wireless device or one or more criteria to be used by the wireless device to select the one of the two or more predefined mapping tables to be used by the wireless device. The network node is further adapted to send, from the network node to the wireless device, a transmit power control command to be mapped to a power adjustment value by the wireless device using the one of the two or more predefined transmit power control mapping tables.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 17 is a flow chart that illustrates methods implemented in a communication system including a host computer, a base station, and a UE in accordance with some embodiments of the present disclosure;

FIG. 18 is a flow chart that illustrates methods implemented in a communication system including a host computer, a base station, and a UE in accordance with some embodiments of the present disclosure;

FIG. 19 is a flow chart that illustrates methods implemented in a communication system including a host computer, a base station, and a UE in accordance with some embodiments of the present disclosure;

FIG. 20 is a flow chart that illustrates methods implemented in a communication system including a host computer, a base station, and a UE in accordance with some embodiments of the present disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

In regard to controlling/mitigating interference caused by aerial User Equipments (UEs), e.g., in a Long Term Evolution (LTE) network, there currently exist certain challenge(s). The proposals for addressing this issue in [4] and [5] involve changing some cell specifically configured parameters (i.e., the same parameters are applicable to all UEs in a cell) currently specified in LTE to UE specifically configured parameters (i.e., the parameters can be different among UEs in the same cell) such as $\alpha_c$ and $P_{CMAX,c}(i')$ which are semi-statically configured. It should be noted that changing these semi-statically configured parameters on a UE specific basis can only be effective during the initial uplink data transmission. These parameters are used to control the initial UE transmit power. When closed-loop power control is enabled, transmit power of a UE can be adjusted by the enhanced or evolved Node B (eNB) more dynamically as discussed above. For the proposal of using a UE specific $P_{CMAX,c}(i')$ for aerial UEs, it does not fully solve the uplink interference problem because an aerial UE with low $P_{CMAX,c}(i')$ can still cause uplink interference if a small number of Resource Blocks (RBs) or bandwidth is scheduled, in which case, the per RB transmit power can be high while the total transmit power can still be below $P_{CMAX,c}(i')$. It can still cause interference to UEs in neighbor cells in those scheduled RBs.

Figure 1:
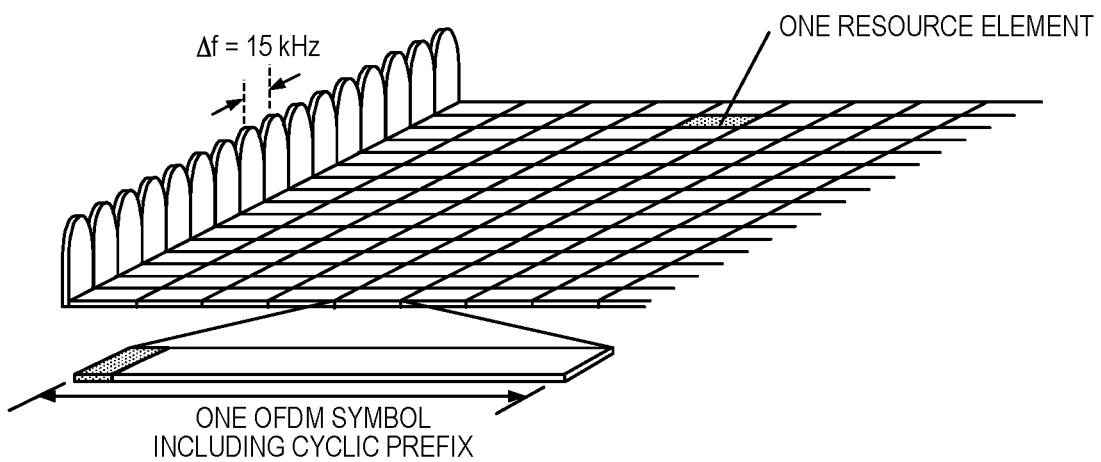
FIG. 1 illustrates the basic Long Term Evolution (LTE) downlink physical resource.
Figure 2:
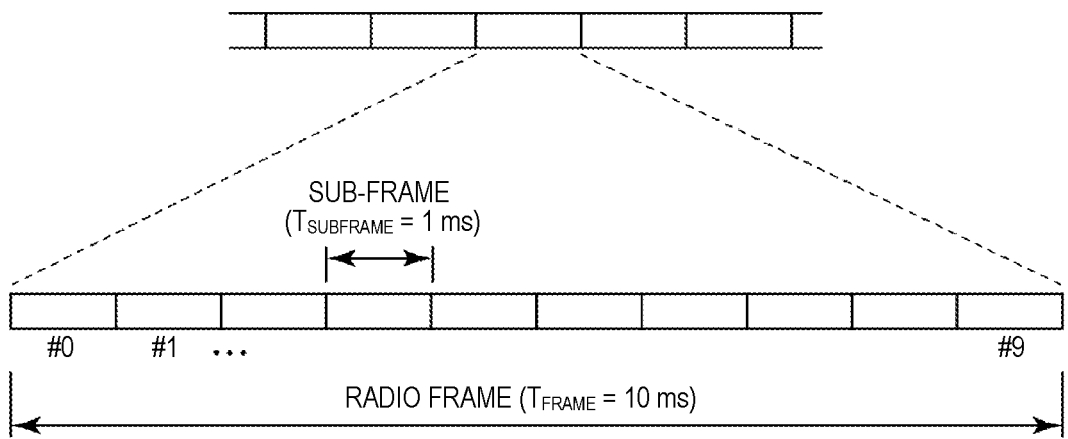
FIG. 2 illustrates the LTE time-domain structure.
Figure 3:
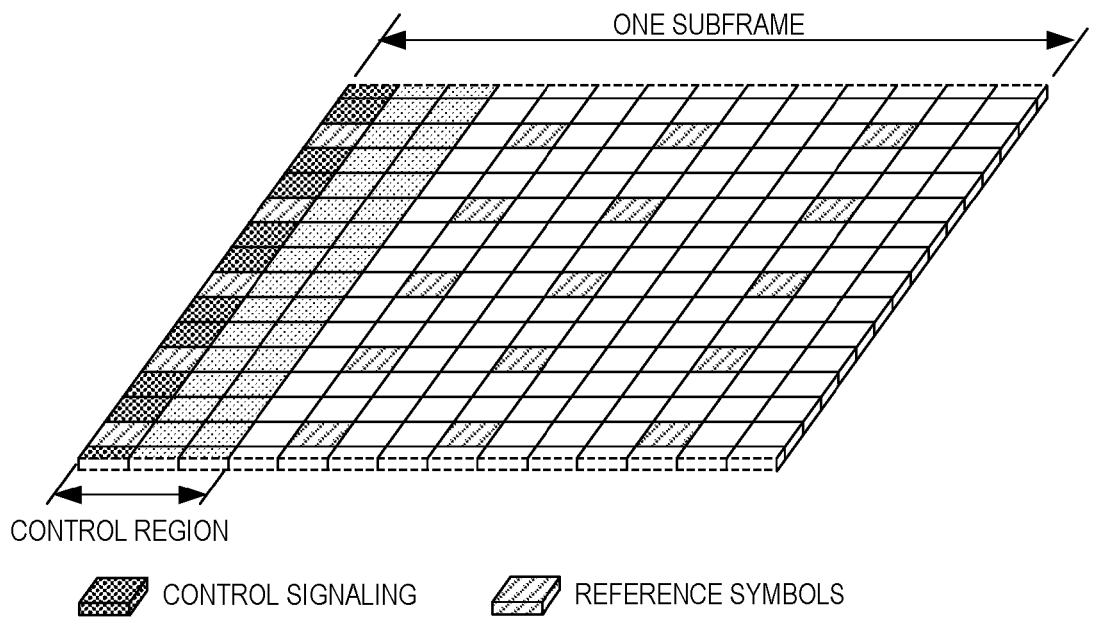
FIG. 3 illustrates a downlink subframe using three Orthogonal Frequency Division Multiplexing (OFDM) symbols as control.
Figure 4:
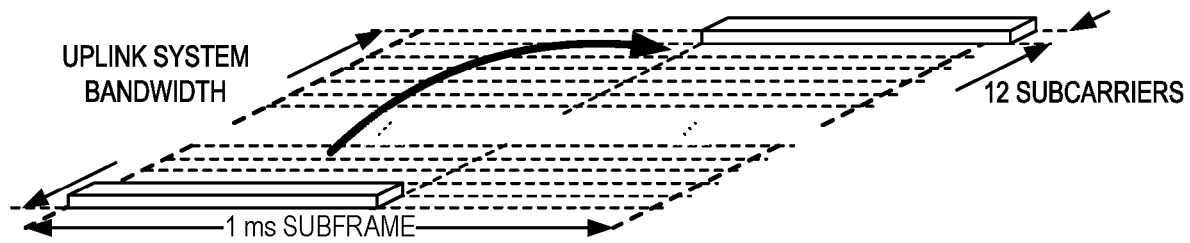
FIG. 4 illustrates an uplink L1/L2 control signaling transmission on the Physical Uplink Control Channel (PUCCH)
Figure 5:
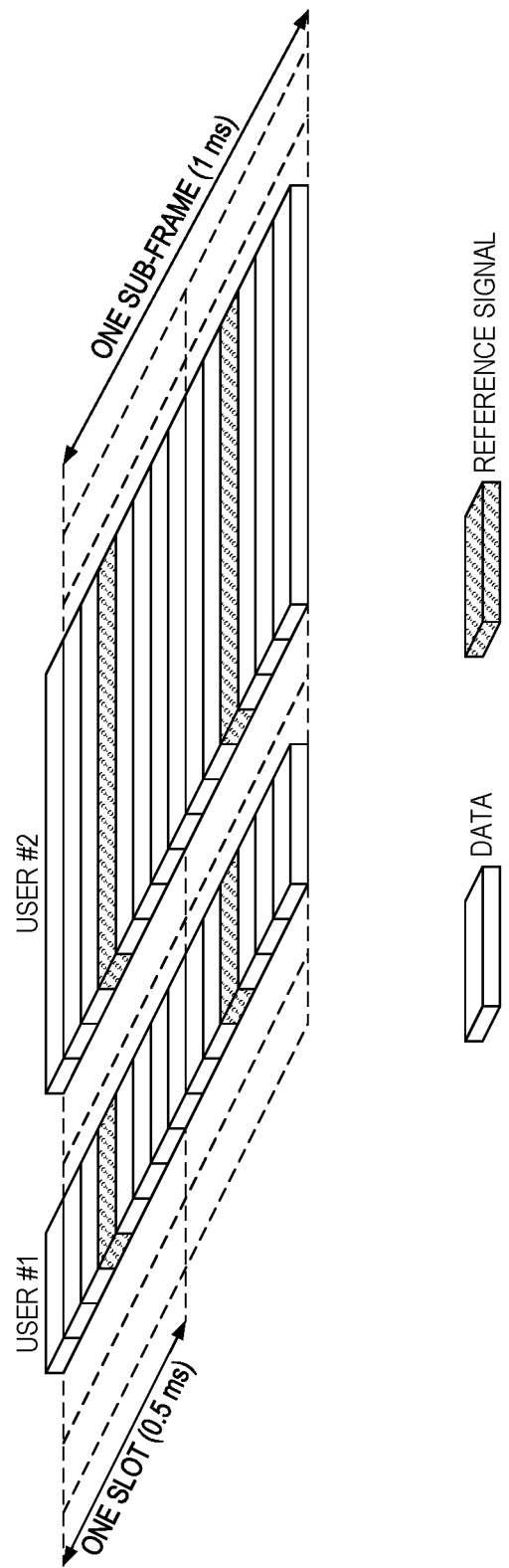
FIG. 5 illustrates Physical Uplink Shared Channel (PUSCH) resource assignment.
Figure 6:
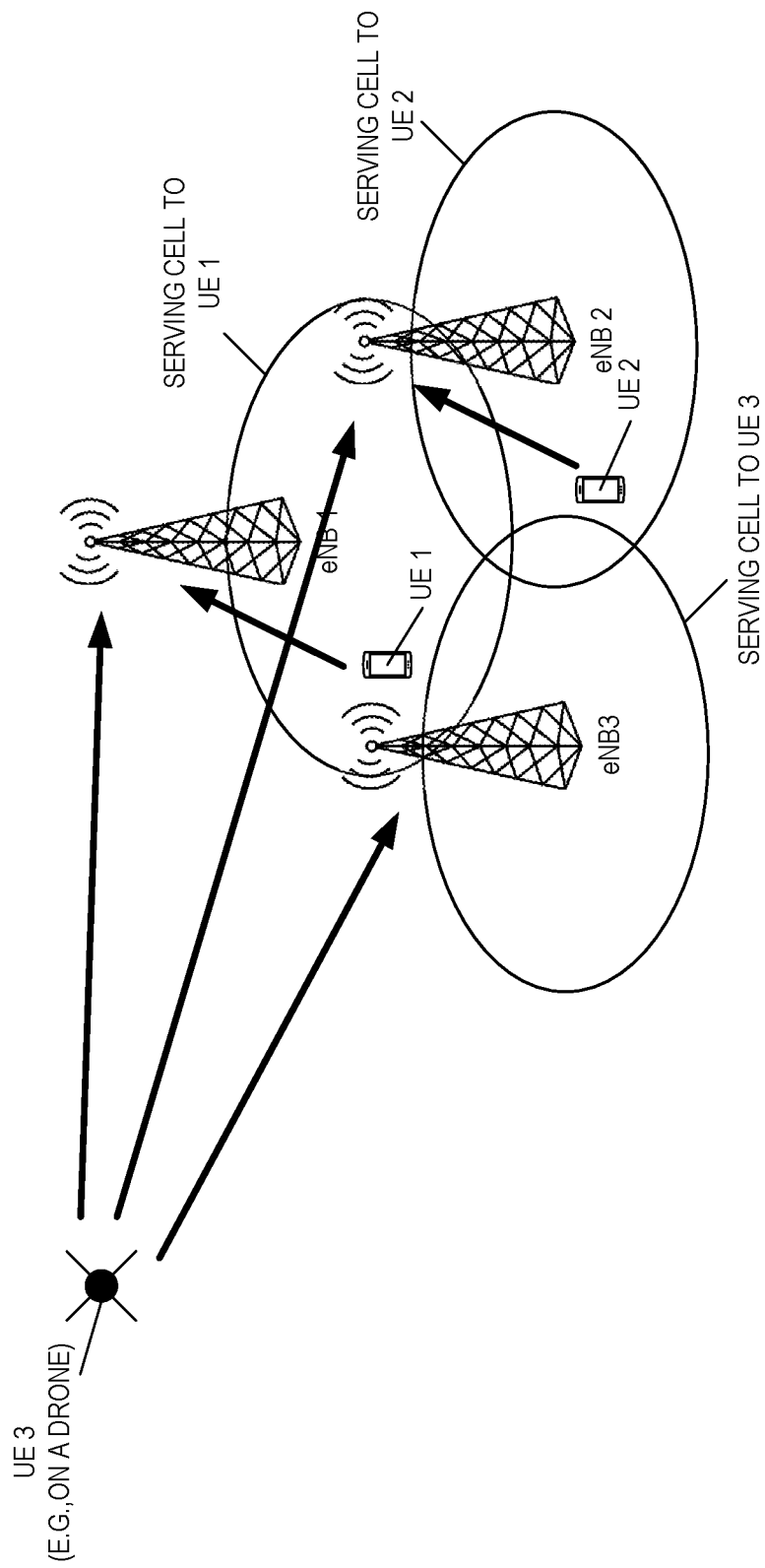
FIG. 6 illustrates uplink interference caused by a User Equipment (UE) attached to a drone to ground UEs in neighboring cells.
Figure 7:
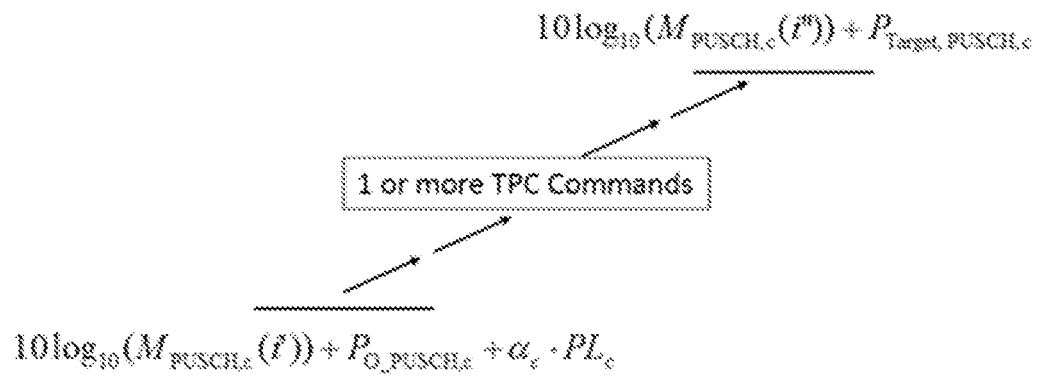
FIG. 7 is an illustration of initial PUSCH transmit power (shown on bottom left) and Transmit Power Control (TPC) command based adjustments to reach a target PUSCH transmit power setting (shown on top right) in a UE.
Figure 8:
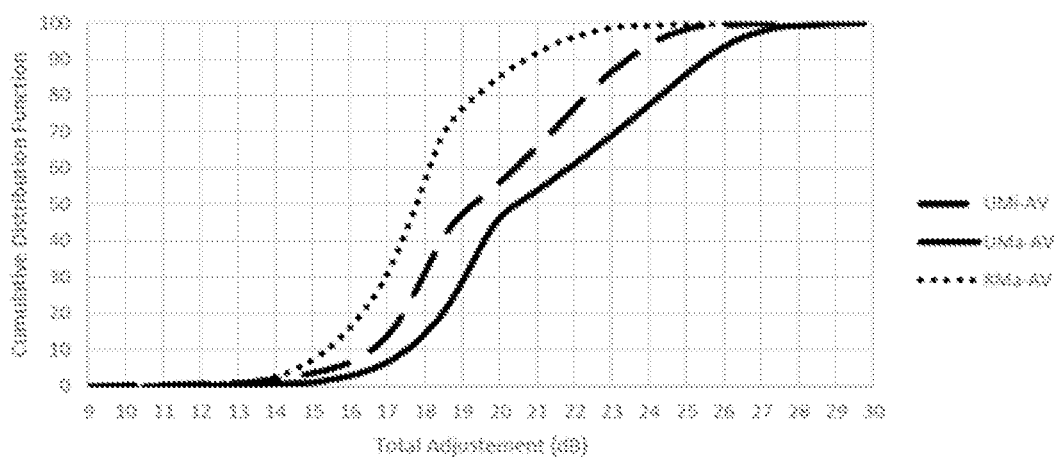
FIG. 8 shows the cumulative distribution function of the total adjustments needed in closed loop power control for three different aerial vehicle scenarios when the fractional pathloss compensation power control parameter $\alpha_c$=0.8.

For the existing closed loop power control scheme discussed above, the range of values currently supported for $\delta_{PUSCH,c}$ are too limited for the aerial vehicle scenarios. As shown in FIG. 8, the total adjustment needed during closed loop power control for the Urban Micro for Aerial Vehicles (UMi-AV), Urban Macro for Aerial Vehicles (UMa-AV), and Rural Macro for Aerial Vehicles (RMa-AV) scenarios has a wide range from 9 decibels (dB) to 30 dB. At the median point of the Cumulative Distribution Function (CDF) curves for UMi-AV, UMa-AV, and RMa-AV require total adjustments of 19 dB, 20 dB, and 18 dB respectively. If the Transmit Power Control (TPC) command with 2-bit field is used with accumulation enabled, then the maximum value allowed for $\delta_{PUSCH,c}$ in the current LTE specifications (see Table 1) is 3 dB. This means that to achieve the required total adjustments for the median point of the CDF for the 3 aerial vehicle scenarios, 6-7 TPC commands are needed. This represents a large delay and control signaling overhead specifically when the TPC commands are sent to UEs individually, i.e., the control signaling overhead will increase with increasing number of UEs in the system. It should be noted that the closed loop power control for aerial UEs also needs to cope with potentially fast signal changes in the sky since aerial vehicles may be served by the side lobes of eNB antennas. Another disadvantage with the existing closed loop power control in LTE is that it will result in slow convergence to the desired received power. Hence, uplink performance of the UEs may be degraded until the convergence is reached.

In addition, with the exiting TPC commands, only −1 dB can be adjusted at each time if transmit power reduction is needed. If the existing TPC command scheme as specified in LTE is used in [7], it means that in some cases it could take many steps to make a desired power adjustment. This also implies slow convergence to the desired received power. This may result in degraded uplink performance of the terrestrial UEs until the transmit power of the aerials are reduced to a desired power using many TPC commands.

Certain aspects of the present disclosure and their embodiments may provide solutions to these or other challenges. In some embodiments (referred to herein as Embodiment 1), signaling for a fast closed loop power control scheme is proposed with TPC command field size is maintained at 2-bits. In this approach, the maximum value allowed for $\delta_{PUSCH,}$c is higher than 3 dB when accumulation is enabled. The UE is semi-statically configured with a parameter that enables/disables step sizes larger than 3 dB for $\delta_{PUSCH,}$ c.

In some other embodiments (referred to herein as Embodiment 2), signaling for a fast closed loop power control scheme is proposed with TPC command field size is increased to more than 2 bits. In this embodiment, the maximum value allowed for $\delta_{PUSCH,c}$ is greater than 3 dB and the minimum value allowed for $\delta_{PUSCH,c}$ is less than −1 dB when accumulation is enabled. In addition, due to additional states available due to the usage of more than 2 bits, additional values (i.e., values in addition to values of −4 dB, −1 dB, 1 dB, and 4 dB supported in Table 2) of $\delta_{PUSCH,c}$ are allowed when accumulation is disabled in this embodiment. In this embodiment, the UE is semi-statically configured with a parameter that enables/disables the use of a TPC command field with more than 2 bits.

Certain embodiments may provide one or more of the following technical advantage(s). The advantages of Embodiment 1 are two-fold. Firstly, due to step sizes larger than 3 dB allowed for in this embodiment, the number of TPC commands can be reduced which means that the control signaling overhead can be reduced (i.e., when the TPC commands are sent to UEs individually). Secondly, a closed loop power control scheme employing the signaling in this embodiment will ensure fast convergence to the desired received power, hence improving the uplink performance of the UEs due to fast convergence.

The advantages of Embodiment 2 are two-fold. Firstly, due to more states available in a table with TPC command field size greater than 2 bits, the number of TPC commands can be reduced with higher resolution. This means that the control signaling overhead can be reduced (i.e., when the TPC commands are sent to UEs individually). Secondly, a closed loop power control scheme employing the signaling in this embodiment will ensure fast convergence to the desired received power with higher resolution, hence improving the uplink performance of the UEs due to fast convergence.

Embodiment 1

In this embodiment, the number of bits in the TPC commands is maintained at 2 bits while the maximum value allowed for $\delta_{PUSCH,c}$ is higher than 3 dB when accumulation is enabled. This embodiment may apply to some or all Downlink Control Information (DCI) formats 0/0A/0B/3/4/4A/4B/6-0A/3B. An example of this embodiment is given in Table 3 where the maximum allowed value for $\delta_{PUSCH,c}$ is modified to 9 dB. This is indicated by the last state '3' of the 2 bit TPC command field. This embodiment may be reflected in Third Generation Partnership Project (3GPP) Technical Specification (TS) 36.213 [2] by introducing a new mapping table that maps the 2 bit TPC command field to a $\delta_{PUSCH,c}$ value that can be higher than 3 dB with accumulation enabled.

In this embodiment, the UE is semi-statically configured with a parameter that enables/disables step sizes larger than 3 dB for $\delta_{PUSCH,c}$. If this semi-statically configured parameter is set, then the UE which receives a TPC command with accumulation enabled in some or all DCI formats 0/0A/0B/3/4/4A/4B/6-0A/3B will use the new mapping table that maps the 2 bit TPC command field to a $\delta_{PUSCH,c}$ value that can be higher than 3 dB. This $\delta_{PUSCH,c}$ is used by the UE when interpreting the correction value of $\delta_{PUSCH,c}$ to be used when updating the PUSCH power control adjustment term when updating $f_c(i')$ during closed loop power control. If this semi-statically configured parameter is not set, the UE which receives a TPC command with accumulation enabled in some or all DCI formats 0/0A/0B/3/4/4A/4B/6-0A/3B will use the existing mapping table in Table 1.

The advantages of this embodiment are two-fold. Firstly, due to step sizes larger than 3 dB allowed for $\delta_{PUSCH,c}$ in this embodiment, the number of TPC commands can be reduced which means that the control signaling overhead can be reduced (i.e., when the TPC commands are sent to UEs individually). Secondly, a closed loop power control scheme employing the signaling in this embodiment will ensure fast convergence to the desired received power, hence improving the uplink performance of the UEs due to fast convergence.

TABLE 3

An example mapping of TPC Command Field in DCI format 0/0A/0B/3/4/4A/4B/6-0A/3B to absolute and accumulated $\delta_{PUSCH,c}$ values

| TPC Command Field in DCI format 0/0A/0B/3/4/4A/4B/6-0A/3B | Accumulated $\delta_{PUSCH,c}$ [dB] | Absolute $\delta_{PUSCH,c}$ [dB] only DCI format 0/0A/0B/4/4A/4B/6-0A |
| --- | --- | --- |
| 0 | −1 | −4 |
| 1 | 0 | −1 |
| 2 | 1 | 1 |
| 3 | 9 | 4 |

In an alternative embodiment, an entry of −x dB may be added in the table to allow fast power reduction, where x>1.

Embodiment 2

In this embodiment, the number of bits in the TPC commands are increased beyond 2 bits while the maximum value allowed for $\delta_{PUSCH,c}$ is higher than 3 dB when accumulation is enabled. This embodiment may apply to some or all DCI formats 0/0A/0B/3/4/4A/4B/6-0A/3B. In addition, due to additional states available due to the usage of more than 2 bits, additional values (in addition to values of −4 dB, −1 dB, 1 dB, and 4 dB supported in Table 2) of $\delta_{PUSCH,c}$ are allowed when accumulation is disabled in this embodiment. An example of this embodiment is given in Table 4, where a 3 bit TPC command field is used. In this example, when accumulation is enabled, additional values of −3 dB, 6 dB, 9 dB, and 12 dB for $\delta_{PUSCH,c}$ are available in addition to −1 dB, 0 dB, 1 dB, and 3 dB. This would allow for fast power adjustment in both directions, either increasing or decreasing transmit power. Furthermore, when accumulation is disabled, additional values of −10 dB, −7 dB, 7 dB, and 10 dB for $\delta_{PUSCH,c}$ are available in addition to −4 dB, −1 dB, 1 dB, and 4 dB. This example embodiment may be reflected in 3GPP specification TS 36.213 [2] by introducing a new mapping table that maps the 3 bit TPC command field to a $\delta_{PUSCH,c}$ value as shown in Table 4.

In this embodiment, the UE is semi-statically configured with a parameter that enables/disables a new table corresponding to a TPC command field with more than 2 bits. If this semi-statically configured parameter is set, then the UE which receives a TPC command with accumulation enabled or disabled in some or all DCI formats 0/0A/0B/3/4/4A/4B/ 6-0A/3B will use the new mapping table that maps the TPC command field with higher than 2 bits to a $\delta_{PUSCH,c}$ value. This $\delta_{PUSCH,c}$ is used by the UE when interpreting the correction value of $\delta_{PUSCH,c}$ to be used when updating the PUSCH power control adjustment term when updating $f_c(i')$ during closed loop power control. If this semi-statically configured parameter is not set, the UE which receives a TPC command with accumulation enabled in some or all DCI formats 0/0A/0B/3/4/4A/4B/6-0A/3B will use the existing mapping table in Table 1.

The advantages of this embodiment are two-fold. Firstly, due to more states available in a table with TPC command field size greater than 2 bits, the number of TPC commands can be reduced with higher resolution. This means that the control signaling overhead can be reduced (i.e., when the TPC commands are sent to UEs individually). Secondly, a closed loop power control scheme employing the signaling in this embodiment will ensure fast convergence to the desired received power, hence improving the uplink performance of the UEs due to fast convergence.

TABLE 4

An example mapping of TPC Command Field for Embodiment 2 in DCI format 0/0A/0B/3/4/4A/4B/6-0A/3B to absolute and accumulated $\delta_{PUSCH,c}$ values

| TPC Command Field in DCI format 0/0A/0B/3/4/ 4A/4B/6-0A/3B | Accumulated $\delta_{PUSCH,c}$ [dB] | Absolute $\delta_{PUSCH,c}$ [dB] only DCI format 0/0A/0B/4/4A/4B/6-0A |
|---|---|---|
| 0 | −3 | −10 |
| 1 | −1 | −7 |
| 2 | 0 | −4 |
| 3 | 1 | −1 |
| 4 | 3 | 1 |
| 5 | 6 | 4 |
| 6 | 9 | 7 |
| 7 | 12 | 10 |

Embodiment 3

In this embodiment, the closed loop power control in TPC commands may include fast adjustment of pathloss compensation factor $\alpha_c$. In contrast to the existing semi-static way of configuring pathloss compensation factor $\alpha_c$, fast $\alpha_c$ update in TPC commands may be beneficial for aerials flying in the sky due to their potential fast signal change. Similar to Embodiments 1 and 2, this can be achieved by reinterpreting existing bits in DCIs or introducing new fields in DCIs. In some embodiments, pathloss compensation factor $\alpha_c$ is jointly indicated with correction value of $\delta_{PUSCH,c}$ with larger step sizes as proposed in Embodiments 1 and 2.

Embodiment 4

This embodiment is about the criteria that can be used in some cases to enable the new schemes described in Embodiments 1, 2, and 3.

Embodiment 4.1: In this sub-embodiment, the new schemes are enabled by the network with an explicit signaling. The network may decide to enable the new scheme in Embodiments 1, 2, or 3 if the UE reports to the network that it is flying or if the network infers that the UE is flying from measurements at the network side and/or measurement reports from the UE (e.g., Reference Signal Received Power (RSRP) of serving cell and neighbor cells and/or Reference Signal Received Quality (RSRQ)).

Embodiment 4.2: In this sub-embodiment, the new schemes are activated by the UE itself if certain criteria are met. For example, the UE can enable the new schemes if it is in fly mode. As another non-limiting example, certain criteria can be specified, and the UE can enable the new schemes if the criteria are met. The criteria may be based on RSRP of serving cell and neighbor cells and/or RSRQ and/or Reference Signal Strength Indicator (RSSI). For example, the criteria can be that when the number of neighbor cells with large RSRP values relative to the serving cell RSRP (e.g. neighbor cell RSRP minus serving cell RSRP is greater than xdB) exceeds a pre-determined threshold. Similar criteria can be used with RSRQ and RSSI. Note that RSSI can be calculated based on RSRP and RSRQ. So the network specifications may define a mapping f(RSRP, RSRQ) that maps RSRP and RSRQ to a decision on which new schemes should be activated.

Embodiment 5

In [7], a method of dynamically adjusting the target receive power for aerial UEs based on both serving and neighbor cell RSRPs or pathlosses were proposed to mitigate uplink interference caused by the aerial UEs. In this embodiment, it is further proposed that the adjustment of the target receive power for aerial UEs further takes into account RSRQ/RSSI besides serving and neighbor cell RSRPs or pathlosses.

Additional Description

Figure 9:
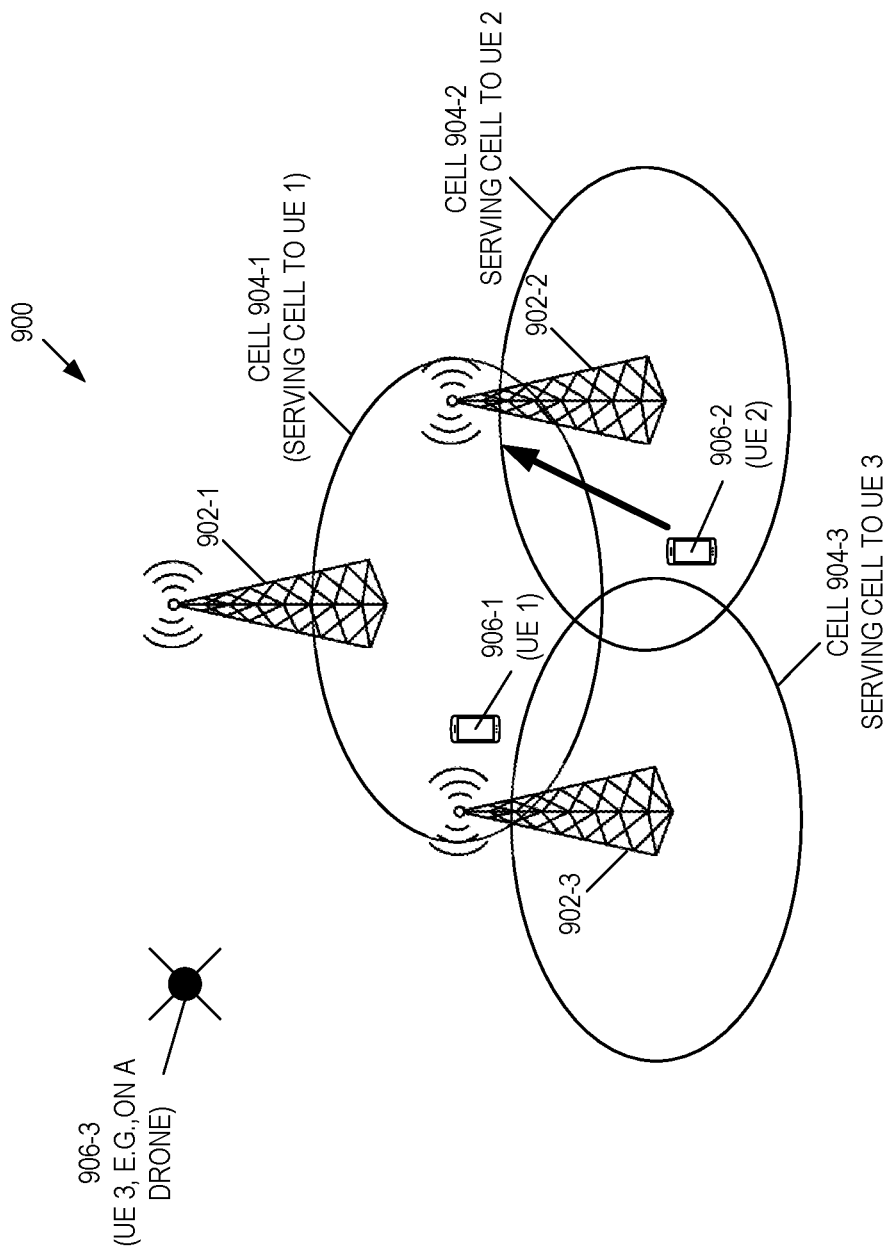
FIG. 9 illustrates one example of a wireless communication system in which embodiments of the present disclosure may be implemented.

In this regard, FIG. 9 illustrates one example of a wireless communication system 900 in which embodiments of the present disclosure may be implemented. However, the present disclosure is not limited thereto. In this example, the wireless communication system 900 is a cellular communications network, which is preferably an LTE network but not limited thereto. The wireless communication system 900 includes a number of network nodes 902-1 through 902-3, which are generally referred to herein collectively as network nodes 902 and individually as a network node 902. The network nodes 902 are, in this example, base stations (e.g., eNBs in an LTE network) providing corresponding cells 904-1 through 904-3, which are generally referred to herein collectively as cells 904 and individually as a cell 904. A number of UEs 906-1 through 906-3 are served by the network nodes 902. The UEs 906-1 through 906-3 are generally referred to herein collectively as UEs 906 and individually as a UE 906. In this example, the UEs 906-1 through 906-3 are also denoted as UE 1, UE 2, and UE 3, respectively. In this example, UE 3 is an aerial UE (e.g., a UE attached to a drone or a drone UE).

Figure 10:
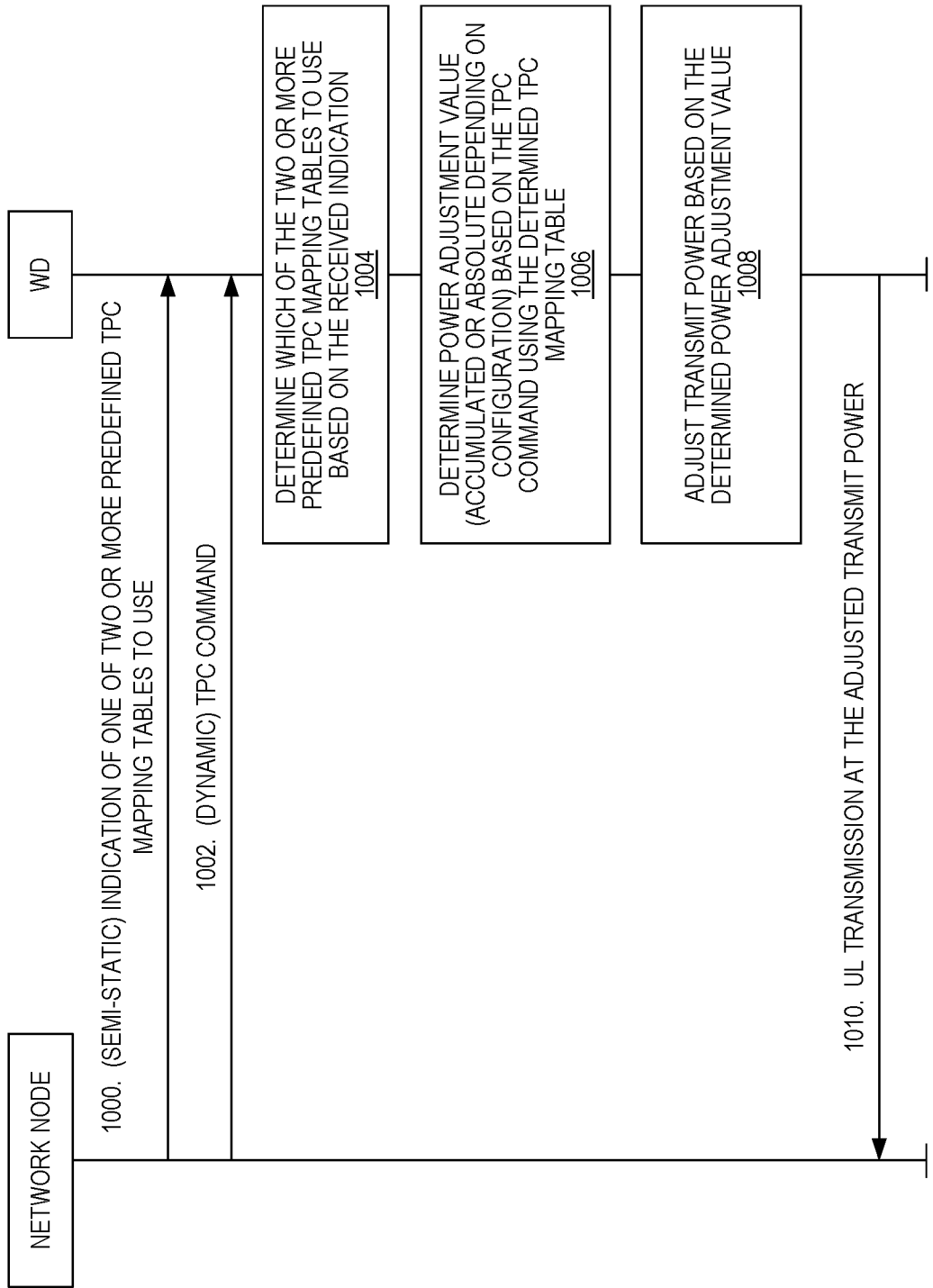
FIG. 10 illustrates the operation of a network node and a wireless device (WD) (also referred to herein as a UE) in accordance with at least some embodiments of the present disclosure.

FIG. 10 illustrates the operation of a network node (e.g., network node 902) and a Wireless Device (WD) (also referred to herein as a UE) (e.g., UE 906) in accordance with at least some of the embodiments described herein. As illustrated, the network node signals or otherwise sends, to the wireless device, an (e.g., semi-static) indication of one of two or more predefined TPC mapping tables to be used by the wireless device (step 1000). As discussed above, the two or more predefined TPC mapping tables include a first TPC mapping table and a second TPC mapping table that is different than the first TPC mapping table. In some embodiments, the first TPC mapping table is an existing table defined in 3GPP LTE (e.g., Table 1 above) and the second TPC mapping table is a new table (e.g., Table 3 or Table 4 above).

In some embodiments, the first TPC mapping table and the second TPC mapping table have a same number of entries, as described above with respect to Embodiment 1 (see, e.g., Table 3 as compared to Table 1). In some embodiments, the first TPC mapping table has four entries corresponding to four different power adjustment values defined by the first TPC mapping table and the second TPC mapping table has four entries corresponding to four different power adjustment values defined by the second TPC mapping table, at least one of which is greater than all of the four power adjustment values defined by the first TPC mapping table (e.g., the accumulated power adjustment value of 9 dB is greater than the largest accumulated power adjustment value in Table 1, which is 3 dB). In some embodiments, the first TPC mapping table has four entries corresponding to four different power adjustment values defined by the first TPC mapping table and the second TPC mapping table has four entries corresponding to four different power adjustment values defined by the second TPC mapping table, at least one of which is less than all of the four power adjustment values defined by the first TPC mapping table.

In some embodiments, the first TPC mapping table has a first number (e.g., 4) of entries and the second TPC mapping table has a second number (e.g., 8) of entries that is not equal to the first number of entries (see, e.g., Table 4 as compared to Table 1). In some embodiments, the first TPC mapping table has four entries corresponding to four different power adjustment values defined by the first TPC mapping table and the second TPC mapping table has eight entries corresponding to eight different power adjustment values defined by the second TPC mapping table, at least one of which is greater than all of the four power adjustment values defined by the first TPC mapping table (e.g., the accumulated power adjustment value of 12 dB in Table 4 is greater than the largest accumulated power adjustment value in Table 1, which is 3 dB). In some embodiments, the first TPC mapping table has four entries corresponding to four different power adjustment values defined by the first TPC mapping table, and the second TPC mapping table has eight entries corresponding to eight different power adjustment values defined by the second TPC mapping table, at least one of which is less than all of the four power adjustment values defined by the first TPC mapping table (e.g., the accumulated power adjustment value of −3 dB in Table 4 is less than the smallest accumulated power adjustment value in Table 1, which is −1 dB). In some embodiments, the first TPC mapping table is a subset of the second TPC mapping table.

In some embodiments, the first and second TPC mapping tables define accumulated power adjustment values and/or non-accumulated (i.e., absolute) power adjustment values.

The network node also sends a (e.g., dynamic) TPC command to the wireless device (step 1002). In some embodiments, the TPC command is comprised in DCI transmitted from the network node to the wireless device.

The wireless device determines which of the two or more predefined TPC mapping tables is to be used by the wireless device based on the received indication (step 1004). The wireless device determines a power adjustment value (which may be an accumulated or absolute value depending in the configuration of the wireless device) (e.g., a value for $\delta_{PUSCH,c}$) based on the received TPC command and the determined TPC mapping table (step 1006). The wireless device adjusts its transmit power based on the determined power adjustment value (step 1008) and transmits an uplink transmission accordingly (step 1010).

Figure 11:
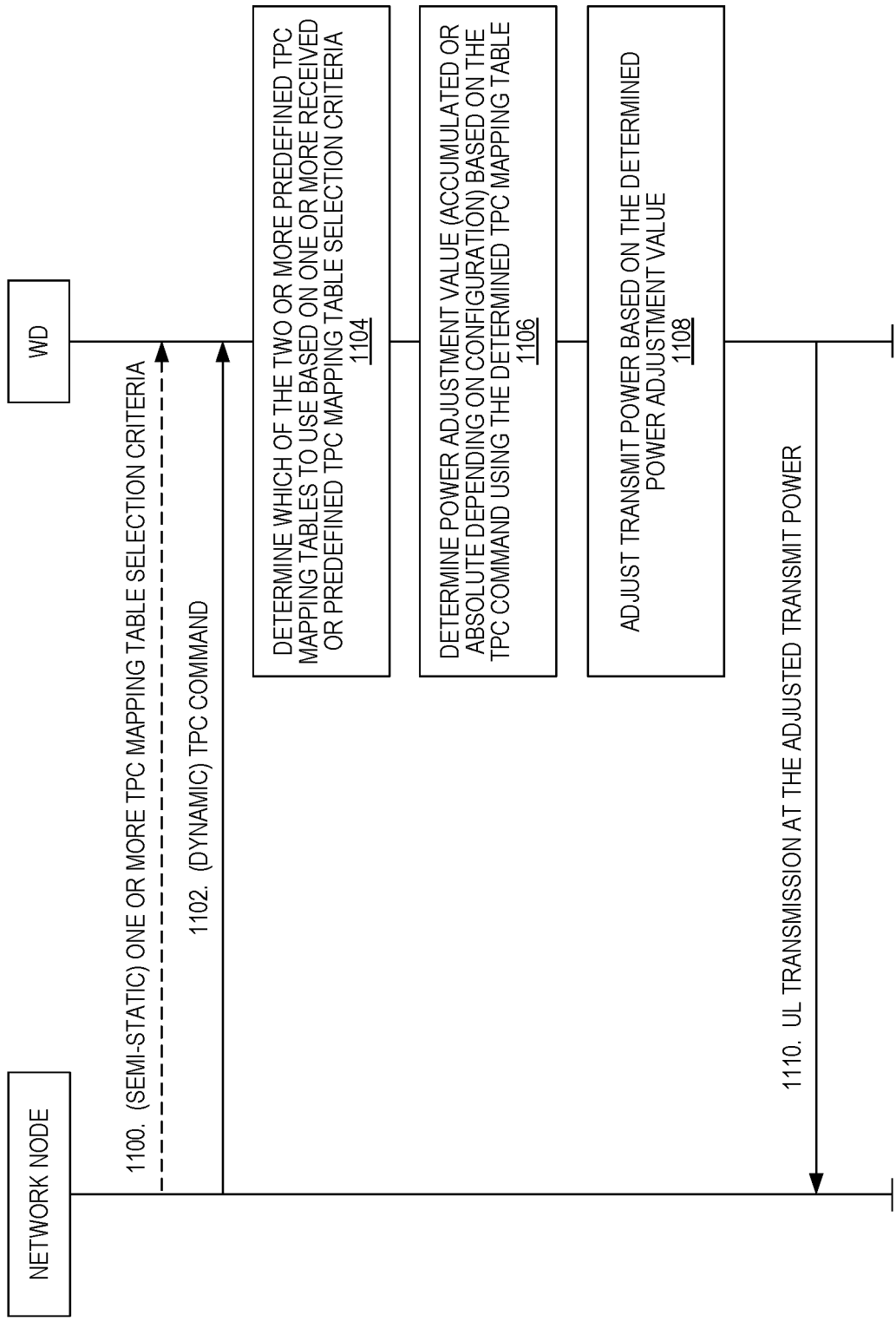
FIG. 11 illustrates the operation of a network node and a WD (also referred to herein as a UE) in accordance with at least some embodiments of the present disclosure.

FIG. 11 illustrates the operation of a network node (e.g., a network node 902) and a Wireless Device (WD) (also referred to herein as a UE) (e.g., a UE 906) in accordance with at least some of the embodiments described herein. As illustrated, the network node optionally signals or otherwise sends, to the wireless device, (e.g., semi-static) one or more criteria to be used by the wireless device to select one of two or more predefined TPC mapping tables to be used by the wireless device (step 1100). Any suitable criteria may be used (e.g., a height criterion such that the second TPC table is used if the height of the wireless device is greater than a defined threshold and otherwise the first TPC table is used). As discussed above, the two or more predefined TPC mapping tables include a first TPC mapping table and a second TPC mapping table that is different than the first TPC mapping table. In some embodiments, the first TPC mapping table is an existing table defined in 3GPP LTE (e.g., Table 1 above) and the second TPC mapping table is a new table (e.g., Table 3 or Table 4 above).

In some embodiments, the first TPC mapping table and the second TPC mapping table have a same number of entries, as described above with respect to Embodiment 1 (see, e.g., Table 3 as compared to Table 1). In some embodiments, the first TPC mapping table has four entries corresponding to four different power adjustment values defined by the first TPC mapping table and the second TPC mapping table has four entries corresponding to four different power adjustment values defined by the second TPC mapping table, at least one of which is greater than all of the four power adjustment values defined by the first TPC mapping table (e.g., the accumulated power adjustment value of 9 dB is greater than the largest accumulated power adjustment value in Table 1, which is 3 dB). In some embodiments, the first TPC mapping table has four entries corresponding to four different power adjustment values defined by the first TPC mapping table and the second TPC mapping table has four entries corresponding to four different power adjustment values defined by the second TPC mapping table, at least one of which is less than all of the four power adjustment values defined by the first TPC mapping table.

In some embodiments, the first TPC mapping table has a first number (e.g., 4) of entries and the second TPC mapping table has a second number (e.g., 8) of entries that is not equal to the first number of entries (see, e.g., Table 4 as compared to Table 1). In some embodiments, the first TPC mapping table has four entries corresponding to four different power adjustment values defined by the first TPC mapping table and the second TPC mapping table has eight entries corresponding to eight different power adjustment values defined by the second TPC mapping table, at least one of which is greater than all of the four power adjustment values defined by the first TPC mapping table (e.g., the accumulated power adjustment value of 12 dB in Table 4 is greater than the largest accumulated power adjustment value in Table 1, which is 3 dB). In some embodiments, the first TPC mapping table has four entries corresponding to four different power adjustment values defined by the first TPC mapping table, and the second TPC mapping table has eight entries corresponding to eight different power adjustment values defined by the second TPC mapping table, at least one of which is less than all of the four power adjustment values defined by the first TPC mapping table (e.g., the accumulated power adjustment value of –3 dB in Table 4 is less than the smallest accumulated power adjustment value in Table 1, which is –1 dB). In some embodiments, the first TPC mapping table is a subset of the second TPC mapping table.

In some embodiments, the first and second TPC mapping tables define accumulated power adjustment values and/or non-accumulated (i.e., absolute) power adjustment values.

The network node also sends a (e.g., dynamic) TPC command to the wireless device (step 1102). In some embodiments, the TPC command is comprised in DCI transmitted from the network node to the wireless device.

The wireless device determines which of the two or more predefined TPC mapping tables is to be used by the wireless device based the one or more received criteria or one or predefined criteria otherwise known to the wireless device (e.g., defined by standard or obtained from memory) (step 1104). The wireless device determines a power adjustment value (which may be an accumulated or absolute value depending in the configuration of the wireless device) (e.g., a value for $\delta_{PUSCH,c}$) based on the received TPC command and the determined TPC mapping table (step 1106). The wireless device adjusts its transmit power based on the determined power adjustment value (step 1108) and transmits an uplink transmission accordingly (step 1110).

Figure 12:
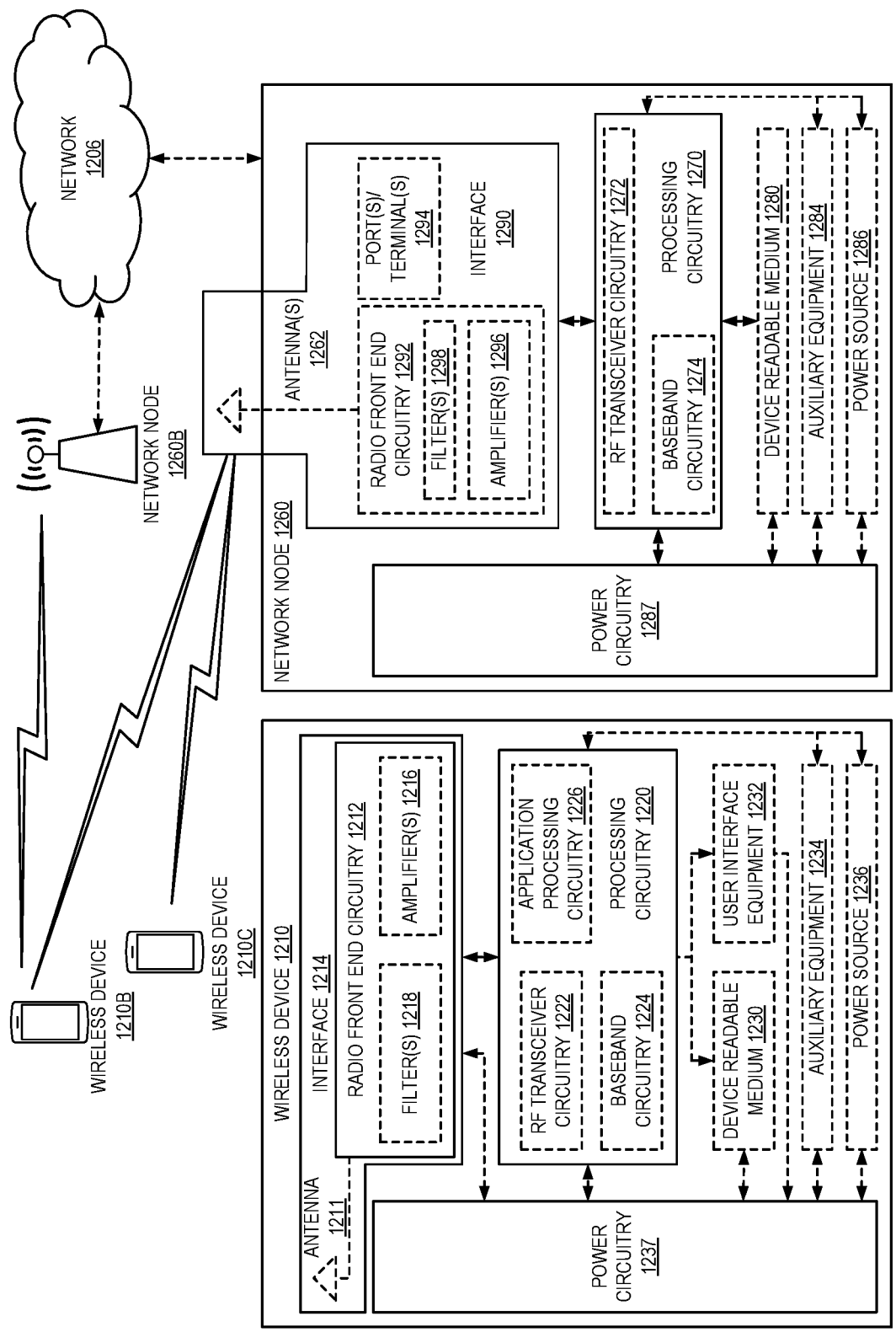
FIG. 12 illustrates an example wireless network in accordance with some embodiments of the present disclosure.

Although the subject matter described herein may be implemented in any appropriate type of system using any suitable components, the embodiments disclosed herein are described in relation to a wireless network, such as the example wireless network illustrated in FIG. 12. For simplicity, the wireless network of FIG. 12 only depicts a network 1206, network nodes 1260 and 1260B, and WDs 1210, 1210B, and 1210C. In practice, a wireless network may further include any additional elements suitable to support communication between wireless devices or between a wireless device and another communication device, such as a landline telephone, a service provider, or any other network node or end device. In some embodiments, the network node of FIGS. 9, 10, and 11 is one of the network nodes 1260, and the wireless device or UE of FIGS. 9, 10, and 11 is one of the WDs 1210. Of the illustrated components, the network node 1260 and the WD 1210 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system.

In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), LTE, and/or other suitable Second, Third, Fourth, or Fifth Generation (2G, 3G, 4G, or 5G) standards; Wireless Local Area Network (WLAN) standards, such as the IEEE 802.11 standards; and/or any other appropriate wireless communication standard, such as the Worldwide Interoperability for Microwave Access (WiMax), Bluetooth, Z-Wave, and/or ZigBee standards.

The network 1206 may comprise one or more backhaul networks, core networks, Internet Protocol (IP) networks, Public Switched Telephone Networks (PSTNs), packet data networks, optical networks, Wide Area Networks (WANs), Local Area Networks (LANs), WLANs, wired networks, wireless networks, metropolitan area networks, and other networks to enable communication between devices.

The network node 1260 and the WD 1210 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged, and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, Access Points (APs) (e.g., radio APs), Base Stations (BSs) (e.g., radio base stations, Node Bs, eNBs, and New Radio (NR) Node Bs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or Remote Radio Units (RRUs), sometimes referred to as Remote Radio Heads (RRHs). Such RRUs may or may not be integrated with an antenna as an antenna integrated radio. Parts of a distributed radio base station may also be referred to as nodes in a Distributed Antenna System (DAS). Yet further examples of network nodes include Multi-Standard Radio (MSR) equipment such as MSR BSs, network controllers such as Radio Network Controllers (RNCs) or BS Controllers (BSCs), Base Transceiver Stations (BTSs), transmission points, transmission nodes, Multi-Cell/Multi-cast Coordination Entities (MCEs), core network nodes (e.g., Mobile Switching Centers (MSCs), Mobility Management Entities (MMEs)), Operation and Maintenance (O&M) nodes, Operations Support System (OSS) nodes, Self-Organizing Network (SON) nodes, positioning nodes (e.g., Evolved Serving Mobile Location Center (E-SMLCs)), and/or Minimization of Drive Tests (MDTs). As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 12, the network node 1260 includes processing circuitry 1270, a device readable medium 1280, an interface 1290, auxiliary equipment 1284, a power source 1286, power circuitry 1287, and an antenna 1262. Although the network node 1260 illustrated in the example wireless network of FIG. 12 may represent a device that includes the illustrated combination of hardware components, other embodiments may comprise network nodes with different combinations of components. It is to be understood that a network node comprises any suitable combination of hardware and/or software needed to perform the tasks, features, functions, and methods disclosed herein. Moreover, while the components of the network node 1260 are depicted as single boxes located within a larger box, or nested within multiple boxes, in practice, a network node may comprise multiple different physical components that make up a single illustrated component (e.g., the device readable medium 1280 may comprise multiple separate hard drives as well as multiple Random Access Memory (RAM) modules).

Similarly, the network node 1260 may be composed of multiple physically separate components (e.g., a Node B component and a RNC component, or a BTS component and a BSC component, etc.), which may each have their own respective components. In certain scenarios in which the network node 1260 comprises multiple separate components (e.g., BTS and BSC components), one or more of the separate components may be shared among several network nodes. For example, a single RNC may control multiple Node Bs. In such a scenario, each unique Node B and RNC pair may in some instances be considered a single separate network node. In some embodiments, the network node 1260 may be configured to support multiple Radio Access Technologies (RATs). In such embodiments, some components may be duplicated (e.g., a separate device readable medium 1280 for the different RATs) and some components may be reused (e.g., the same antenna 1262 may be shared by the RATs). The network node 1260 may also include multiple sets of the various illustrated components for different wireless technologies integrated into the network node 1260, such as, for example, GSM, Wideband Code Division Multiple Access (WCDMA), LTE, NR, WiFi, or Bluetooth wireless technologies. These wireless technologies may be integrated into the same or a different chip or set of chips and other components within the network node 1260.

The processing circuitry 1270 is configured to perform any determining, calculating, or similar operations (e.g., certain obtaining operations) described herein as being provided by a network node. These operations performed by the processing circuitry 1270 may include processing information obtained by the processing circuitry 1270 by, for example, converting the obtained information into other information, comparing the obtained information or converted information to information stored in the network node, and/or performing one or more operations based on the obtained information or converted information, and as a result of said processing making a determination.

The processing circuitry 1270 may comprise a combination of one or more of a microprocessor, a controller, a microcontroller, a Central Processing Unit (CPU), a Digital Signal Processor (DSP), an Application Specific Integrated Circuit (ASIC), a Field Programmable Gate Array (FPGA), or any other suitable computing device, resource, or combination of hardware, software, and/or encoded logic operable to provide, either alone or in conjunction with other network node 1260 components, such as the device readable medium 1280, network node 1260 functionality. For example, the processing circuitry 1270 may execute instructions stored in the device readable medium 1280 or in memory within the processing circuitry 1270. Such functionality may include providing any of the various wireless features, functions, or benefits discussed herein. In some embodiments, the processing circuitry 1270 may include a System on a Chip (SOC).

In some embodiments, the processing circuitry 1270 may include one or more of Radio Frequency (RF) transceiver circuitry 1272 and baseband processing circuitry 1274. In some embodiments, the RF transceiver circuitry 1272 and the baseband processing circuitry 1274 may be on separate chips (or sets of chips), boards, or units, such as radio units and digital units. In alternative embodiments, part or all of the RF transceiver circuitry 1272 and the baseband processing circuitry 1274 may be on the same chip or set of chips, boards, or units.

In certain embodiments, some or all of the functionality described herein as being provided by a network node, base station, eNB, or other such network device may be performed by the processing circuitry 1270 executing instructions stored on the device readable medium 1280 or memory within the processing circuitry 1270. In alternative embodiments, some or all of the functionality may be provided by the processing circuitry 1270 without executing instructions stored on a separate or discrete device readable medium, such as in a hard-wired manner. In any of those embodiments, whether executing instructions stored on a device readable storage medium or not, the processing circuitry 1270 can be configured to perform the described functionality. The benefits provided by such functionality are not limited to the processing circuitry 1270 alone or to other components of the network node 1260, but are enjoyed by the network node 1260 as a whole, and/or by end users and the wireless network generally.

The device readable medium 1280 may comprise any form of volatile or non-volatile computer readable memory including, without limitation, persistent storage, solid state memory, remotely mounted memory, magnetic media, optical media, RAM, Read Only Memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by the processing circuitry 1270. The device readable medium 1280 may store any suitable instructions; data or information, including a computer program; software; an application including one or more of logic, rules, code, tables, etc.; and/or other instructions capable of being executed by the processing circuitry 1270 and utilized by the network node 1260. The device readable medium 1280 may be used to store any calculations made by the processing circuitry 1270 and/or any data received via the interface 1290. In some embodiments, the processing circuitry 1270 and the device readable medium 1280 may be considered to be integrated.

The interface 1290 is used in the wired or wireless communication of signaling and/or data between the network node 1260, a network 1206, and/or WDs 1210. As illustrated, the interface 1290 comprises port(s)/terminal(s)

1294 to send and receive data, for example to and from the network 1206 over a wired connection. The interface 1290 also includes radio front end circuitry 1292 that may be coupled to, or in certain embodiments a part of, the antenna 1262. The radio front end circuitry 1292 comprises filters 1298 and amplifiers 1296. The radio front end circuitry 1292 may be connected to the antenna 1262 and the processing circuitry 1270. The radio front end circuitry 1292 may be configured to condition signals communicated between the antenna 1262 and the processing circuitry 1270. The radio front end circuitry 1292 may receive digital data that is to be sent out to other network nodes or WDs via a wireless connection. The radio front end circuitry 1292 may convert the digital data into a radio signal having the appropriate channel and bandwidth parameters using a combination of the filters 1298 and/or the amplifiers 1296. The radio signal may then be transmitted via the antenna 1262. Similarly, when receiving data, the antenna 1262 may collect radio signals which are then converted into digital data by the radio front end circuitry 1292. The digital data may be passed to the processing circuitry 1270. In other embodiments, the interface 1290 may comprise different components and/or different combinations of components.

In certain alternative embodiments, the network node 1260 may not include separate radio front end circuitry 1292; instead, the processing circuitry 1270 may comprise radio front end circuitry and may be connected to the antenna 1262 without separate radio front end circuitry 1292. Similarly, in some embodiments, all or some of the RF transceiver circuitry 1272 may be considered a part of the interface 1290. In still other embodiments, the interface 1290 may include the one or more ports or terminals 1294, the radio front end circuitry 1292, and the RF transceiver circuitry 1272 as part of a radio unit (not shown), and the interface 1290 may communicate with the baseband processing circuitry 1274, which is part of a digital unit (not shown).

The antenna 1262 may include one or more antennas, or antenna arrays, configured to send and/or receive wireless signals. The antenna 1262 may be coupled to the radio front end circuitry 1292 and may be any type of antenna capable of transmitting and receiving data and/or signals wirelessly. In some embodiments, the antenna 1262 may comprise one or more omni-directional, sector, or panel antennas operable to transmit/receive radio signals between, for example, 2 gigahertz (GHz) and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as Multiple Input Multiple Output (MIMO). In certain embodiments, the antenna 1262 may be separate from the network node 1260 and may be connectable to the network node 1260 through an interface or port.

The antenna 1262, the interface 1290, and/or the processing circuitry 1270 may be configured to perform any receiving operations and/or certain obtaining operations described herein as being performed by a network node. Any information, data, and/or signals may be received from a WD, another network node, and/or any other network equipment. Similarly, the antenna 1262, the interface 1290, and/or the processing circuitry 1270 may be configured to perform any transmitting operations described herein as being performed by a network node. Any information, data, and/or signals may be transmitted to a WD, another network node, and/or any other network equipment.

The power circuitry 1287 may comprise, or be coupled to, power management circuitry and is configured to supply the components of the network node 1260 with power for performing the functionality described herein. The power circuitry 1287 may receive power from the power source 1286. The power source 1286 and/or the power circuitry 1287 may be configured to provide power to the various components of the network node 1260 in a form suitable for the respective components (e.g., at a voltage and current level needed for each respective component). The power source 1286 may either be included in, or be external to, the power circuitry 1287 and/or the network node 1260. For example, the network node 1260 may be connectable to an external power source (e.g., an electricity outlet) via an input circuitry or interface such as an electrical cable, whereby the external power source supplies power to the power circuitry 1287. As a further example, the power source 1286 may comprise a source of power in the form of a battery or battery pack which is connected to, or integrated in, the power circuitry 1287. The battery may provide backup power should the external power source fail. Other types of power sources, such as photovoltaic devices, may also be used.

Alternative embodiments of the network node 1260 may include additional components beyond those shown in FIG. 12 that may be responsible for providing certain aspects of the network node's functionality, including any of the functionality described herein and/or any functionality necessary to support the subject matter described herein. For example, the network node 1260 may include user interface equipment to allow input of information into the network node 1260 and to allow output of information from the network node 1260. This may allow a user to perform diagnostic, maintenance, repair, and other administrative functions for the network node 1260.

As used herein, WD refers to a device capable, configured, arranged, and/or operable to communicate wirelessly with network nodes and/or other WDs. Unless otherwise noted, the term WD may be used interchangeably herein with UE. Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a Voice over IP (VoIP) phone, a wireless local loop phone, a desktop computer, a Personal Digital Assistant (PDA), a wireless camera, a gaming console or device, a music storage device, a playback appliance, a wearable terminal device, a wireless endpoint, a mobile station, a tablet, a laptop, Laptop Embedded Equipment (LEE), Laptop Mounted Equipment (LME), a smart device, a wireless Customer Premise Equipment (CPE), a vehicle mounted wireless terminal device, etc. A WD may support Device-to-Device (D2D) communication, for example by implementing a 3GPP standard for sidelink communication, Vehicle-to-Vehicle (V2V), Vehicle-to-Infrastructure (V2I), Vehicle-to-Everything (V2X), and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a Machine-to-Machine (M2M) device, which may in a 3GPP context be referred to as a Machine-Type Communication (MTC) device. As one particular example, the WD may be a UE implementing the 3GPP Narrowband IoT (NB-IoT) standard. Particular examples of such machines or devices are sensors, metering devices such as power meters, industrial machinery, home or personal appliances (e.g., refrigerators, televisions, etc.), or personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated in FIG. 12, a WD 1210 includes an antenna 1211, an interface 1214, processing circuitry 1220, a device readable medium 1230, user interface equipment 1232, auxiliary equipment 1234, a power source 1236, and power circuitry 1237. The WD 1210 may include multiple sets of one or more of the illustrated components for different wireless technologies supported by the WD 1210, such as, for example, GSM, WCDMA, LTE, NR, WiFi, WiMAX, or Bluetooth wireless technologies, just to mention a few. These wireless technologies may be integrated into the same or different chips or set of chips as other components within the WD 1210.

The antenna 1211 may include one or more antennas or antenna arrays configured to send and/or receive wireless signals and is connected to the interface 1214. In certain alternative embodiments, the antenna 1211 may be separate from the WD 1210 and be connectable to the WD 1210 through an interface or port. The antenna 1211, the interface 1214, and/or the processing circuitry 1220 may be configured to perform any receiving or transmitting operations described herein as being performed by a WD. Any information, data, and/or signals may be received from a network node and/or another WD. In some embodiments, radio front end circuitry and/or the antenna 1211 may be considered an interface.

As illustrated, the interface 1214 comprises radio front end circuitry 1212 and the antenna 1211. The radio front end circuitry 1212 comprises one or more filters 1218 and amplifiers 1216. The radio front end circuitry 1212 is connected to the antenna 1211 and the processing circuitry 1220 and is configured to condition signals communicated between the antenna 1211 and the processing circuitry 1220. The radio front end circuitry 1212 may be coupled to or be a part of the antenna 1211. In some embodiments, the WD 1210 may not include separate radio front end circuitry 1212; rather, the processing circuitry 1220 may comprise radio front end circuitry and may be connected to the antenna 1211. Similarly, in some embodiments, some or all of RF transceiver circuitry 1222 may be considered a part of the interface 1214. The radio front end circuitry 1212 may receive digital data that is to be sent out to other network nodes or WDs via a wireless connection. The radio front end circuitry 1212 may convert the digital data into a radio signal having the appropriate channel and bandwidth parameters using a combination of the filters 1218 and/or the amplifiers 1216. The radio signal may then be transmitted via the antenna 1211. Similarly, when receiving data, the antenna 1211 may collect radio signals which are then converted into digital data by the radio front end circuitry 1212. The digital data may be passed to the processing circuitry 1220. In other embodiments, the interface 1214 may comprise different components and/or different combinations of components.

The processing circuitry 1220 may comprise a combination of one or more of a microprocessor, a controller, a microcontroller, a CPU, a DSP, an ASIC, a FPGA, or any other suitable computing device, resource, or combination of hardware, software, and/or encoded logic operable to provide, either alone or in conjunction with other WD 1210 components, such as the device readable medium 1230, WD 1210 functionality. Such functionality may include providing any of the various wireless features or benefits discussed herein. For example, the processing circuitry 1220 may execute instructions stored in the device readable medium 1230 or in memory within the processing circuitry 1220 to provide the functionality disclosed herein.

As illustrated, the processing circuitry 1220 includes one or more of the RF transceiver circuitry 1222, baseband processing circuitry 1224, and application processing circuitry 1226. In other embodiments, the processing circuitry 1220 may comprise different components and/or different combinations of components. In certain embodiments, the processing circuitry 1220 of the WD 1210 may comprise a SOC. In some embodiments, the RF transceiver circuitry 1222, the baseband processing circuitry 1224, and the application processing circuitry 1226 may be on separate chips or sets of chips. In alternative embodiments, part or all of the baseband processing circuitry 1224 and the application processing circuitry 1226 may be combined into one chip or set of chips, and the RF transceiver circuitry 1222 may be on a separate chip or set of chips. In still alternative embodiments, part or all of the RF transceiver circuitry 1222 and the baseband processing circuitry 1224 may be on the same chip or set of chips, and the application processing circuitry 1226 may be on a separate chip or set of chips. In yet other alternative embodiments, part or all of the RF transceiver circuitry 1222, the baseband processing circuitry 1224, and the application processing circuitry 1226 may be combined in the same chip or set of chips. In some embodiments, the RF transceiver circuitry 1222 may be a part of the interface 1214. The RF transceiver circuitry 1222 may condition RF signals for the processing circuitry 1220.

In certain embodiments, some or all of the functionality described herein as being performed by a WD may be provided by the processing circuitry 1220 executing instructions stored on the device readable medium 1230, which in certain embodiments may be a computer-readable storage medium. In alternative embodiments, some or all of the functionality may be provided by the processing circuitry 1220 without executing instructions stored on a separate or discrete device readable storage medium, such as in a hard-wired manner. In any of those particular embodiments, whether executing instructions stored on a device readable storage medium or not, the processing circuitry 1220 can be configured to perform the described functionality. The benefits provided by such functionality are not limited to the processing circuitry 1220 alone or to other components of the WD 1210, but are enjoyed by the WD 1210 as a whole, and/or by end users and the wireless network generally.

The processing circuitry 1220 may be configured to perform any determining, calculating, or similar operations (e.g., certain obtaining operations) described herein as being performed by a WD. These operations, as performed by the processing circuitry 1220, may include processing information obtained by the processing circuitry 1220 by, for example, converting the obtained information into other information, comparing the obtained information or converted information to information stored by the WD 1210, and/or performing one or more operations based on the obtained information or converted information, and as a result of said processing making a determination.

The device readable medium 1230 may be operable to store a computer program; software; an application including one or more of logic, rules, code, tables, etc.; and/or other instructions capable of being executed by the processing circuitry 1220. The device readable medium 1230 may include computer memory (e.g., RAM or ROM), mass storage media (e.g., a hard disk), removable storage media (e.g., a CD or a DVD), and/or any other volatile or non-volatile, non-transitory device readable and/or computer executable memory devices that store information, data, and/or instructions that may be used by the processing circuitry 1220. In some embodiments, the processing circuitry 1220 and the device readable medium 1230 may be considered to be integrated.

The user interface equipment 1232 may provide components that allow for a human user to interact with the WD 1210. Such interaction may be of many forms, such as visual, audial, tactile, etc. The user interface equipment 1232 may be operable to produce output to the user and to allow the user to provide input to the WD 1210. The type of interaction may vary depending on the type of user interface equipment 1232 installed in the WD 1210. For example, if the WD 1210 is a smart phone, the interaction may be via a touch screen; if the WD 1210 is a smart meter, the interaction may be through a screen that provides usage (e.g., the number of gallons used) or a speaker that provides an audible alert (e.g., if smoke is detected). The user interface equipment 1232 may include input interfaces, devices and circuits, and output interfaces, devices and circuits. The user interface equipment 1232 is configured to allow input of information into the WD 1210, and is connected to the processing circuitry 1220 to allow the processing circuitry 1220 to process the input information. The user interface equipment 1232 may include, for example, a microphone, a proximity or other sensor, keys/buttons, a touch display, one or more cameras, a Universal Serial Bus (USB) port, or other input circuitry. The user interface equipment 1232 is also configured to allow output of information from the WD 1210 and to allow the processing circuitry 1220 to output information from the WD 1210. The user interface equipment 1232 may include, for example, a speaker, a display, vibrating circuitry, a USB port, a headphone interface, or other output circuitry. Using one or more input and output interfaces, devices, and circuits of the user interface equipment 1232, the WD 1210 may communicate with end users and/or the wireless network, and allow them to benefit from the functionality described herein.

The auxiliary equipment 1234 is operable to provide more specific functionality which may not be generally performed by WDs. This may comprise specialized sensors for doing measurements for various purposes, interfaces for additional types of communication such as wired communications, etc. The inclusion and type of components of the auxiliary equipment 1234 may vary depending on the embodiment and/or scenario.

The power source 1236 may, in some embodiments, be in the form of a battery or battery pack. Other types of power sources, such as an external power source (e.g., an electricity outlet), photovoltaic devices, or power cells may also be used. The WD 1210 may further comprise the power circuitry 1237 for delivering power from the power source 1236 to the various parts of the WD 1210 which need power from the power source 1236 to carry out any functionality described or indicated herein. The power circuitry 1237 may in certain embodiments comprise power management circuitry. The power circuitry 1237 may additionally or alternatively be operable to receive power from an external power source, in which case the WD 1210 may be connectable to the external power source (such as an electricity outlet) via input circuitry or an interface such as an electrical power cable. The power circuitry 1237 may also in certain embodiments be operable to deliver power from an external power source to the power source 1236. This may be, for example, for the charging of the power source 1236. The power circuitry 1237 may perform any formatting, converting, or other modification to the power from the power source 1236 to make the power suitable for the respective components of the WD 1210 to which power is supplied.

Figure 13:
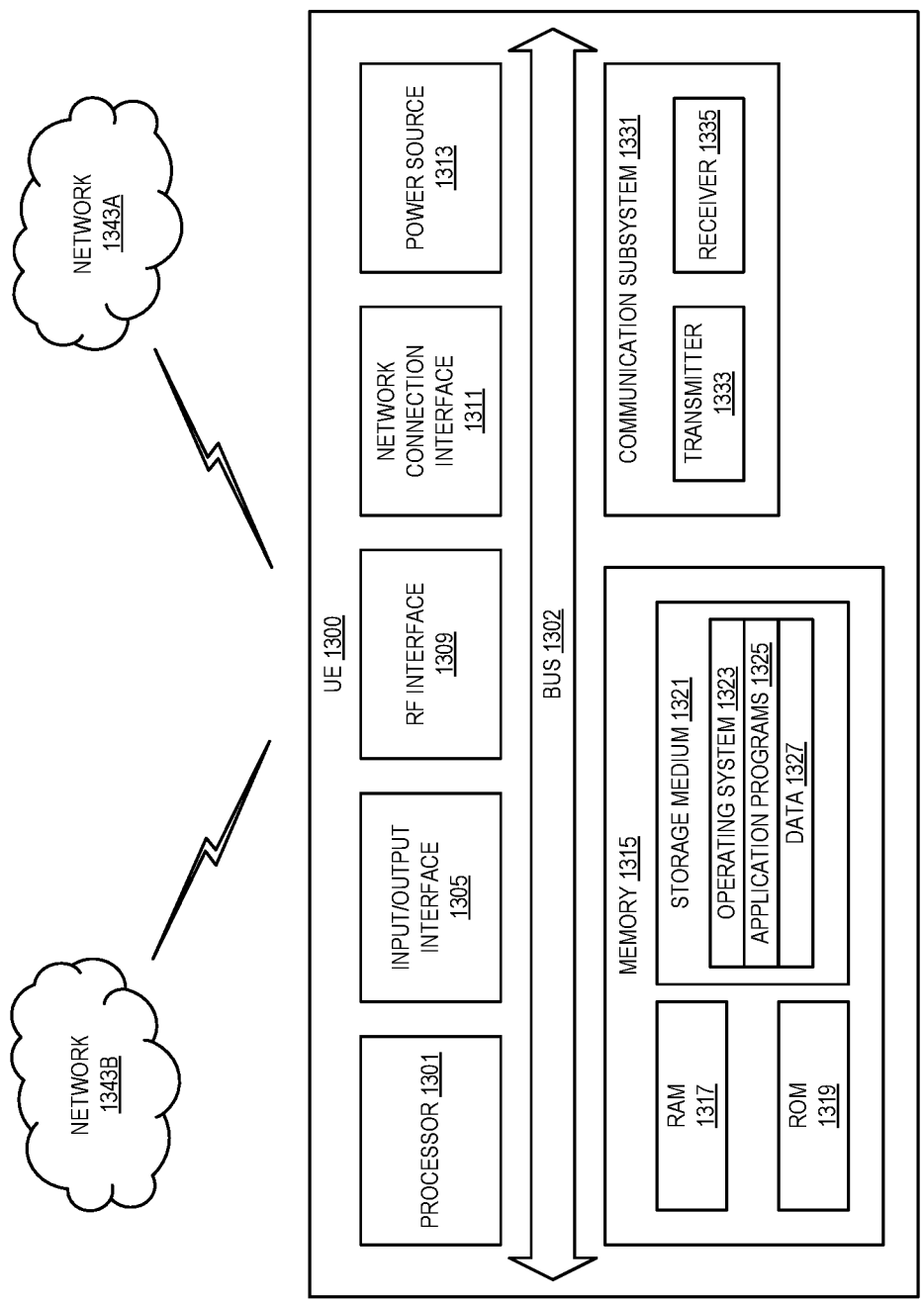
FIG. 13 illustrates an example UE in accordance with some embodiments of the present disclosure.

FIG. 13 illustrates one embodiment of a UE (also referred to herein as a WD) in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). A UE 1300 may be any UE identified by 3GPP, including a NB-IoT UE, a MTC UE, and/or an enhanced MTC (eMTC) UE. The UE 1300, as illustrated in FIG. 13, is one example of a WD configured for communication in accordance with one or more communication standards promulgated by 3GPP, such as 3GPP's GSM, UMTS, LTE, and/or 5G standards. As mentioned previously, the term WD and UE may be used interchangeable. Accordingly, although FIG. 13 is a UE, the components discussed herein are equally applicable to a WD, and vice-versa.

In FIG. 13, the UE 1300 includes processing circuitry 1301 that is operatively coupled to an input/output interface 1305, an RF interface 1309, a network connection interface 1311, memory 1315 including RAM 1317, ROM 1319, and a storage medium 1321 or the like, a communication subsystem 1331, a power source 1313, and/or any other component, or any combination thereof. The storage medium 1321 includes an operating system 1323, an application program 1325, and data 1327. In other embodiments, the storage medium 1321 may include other similar types of information. Certain UEs may utilize all of the components shown in FIG. 13, or only a subset of the components. The level of integration between the components may vary from one UE to another UE. Further, certain UEs may contain multiple instances of a component, such as multiple processors, memories, transceivers, transmitters, receivers, etc.

In FIG. 13, the processing circuitry 1301 may be configured to process computer instructions and data. The processing circuitry 1301 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored programs, general purpose processors, such as a microprocessor or DSP, together with appropriate software; or any combination of the above. For example, the processing circuitry 1301 may include two CPUs. Data may be information in a form suitable for use by a computer.

In the depicted embodiment, the input/output interface 1305 may be configured to provide a communication interface to an input device, output device, or input and output device. The UE 1300 may be configured to use an output device via the input/output interface 1305. An output device may use the same type of interface port as an input device. For example, a USB port may be used to provide input to and output from the UE 1300. The output device may be a speaker, a sound card, a video card, a display, a monitor, a printer, an actuator, an emitter, a smartcard, another output device, or any combination thereof. The UE 1300 may be configured to use an input device via the input/output interface 1305 to allow a user to capture information into the UE 1300. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 13, the RF interface 1309 may be configured to provide a communication interface to RF components such as a transmitter, a receiver, and an antenna. The network connection interface 1311 may be configured to provide a communication interface to a network 1343A. The network 1343A may encompass wired and/or wireless networks such as a LAN, a WAN, a computer network, a wireless network, a telecommunications network, another like network or any combination thereof. For example, the network 1343A may comprise a WiFi network. The network connection interface 1311 may be configured to include a receiver and a transmitter interface used to communicate with one or more other devices over a communication network according to one or more communication protocols, such as Ethernet, TCP/IP, Synchronous Optical Networking (SONET), Asynchronous Transfer Mode (ATM), or the like. The network connection interface 1311 may implement receiver and transmitter functionality appropriate to the communication network links (e.g., optical, electrical, and the like). The transmitter and receiver functions may share circuit components, software, or firmware, or alternatively may be implemented separately.

The RAM 1317 may be configured to interface via a bus 1302 to the processing circuitry 1301 to provide storage or caching of data or computer instructions during the execution of software programs such as the operating system, application programs, and device drivers. The ROM 1319 may be configured to provide computer instructions or data to the processing circuitry 1301. For example, the ROM 1319 may be configured to store invariant low-level system code or data for basic system functions such as basic Input and Output (I/O), startup, or reception of keystrokes from a keyboard that are stored in a non-volatile memory. The Storage medium 1321 may be configured to include memory such as RAM, ROM, Programmable ROM (PROM), Erasable PROM (EPROM), Electrically EPROM (EEPROM), magnetic disks, optical disks, floppy disks, hard disks, removable cartridges, or flash drives. In one example, the storage medium 1321 may be configured to include the operating system 1323, the application program 1325 such as a web browser application, a widget or gadget engine, or another application, and the data file 1327. The storage medium 1321 may store, for use by the UE 1300, any of a variety of various operating systems or combinations of operating systems.

The storage medium 1321 may be configured to include a number of physical drive units, such as a Redundant Array of Independent Disks (RAID), a floppy disk drive, flash memory, a USB flash drive, an external hard disk drive, a thumb drive, a pen drive, a key drive, a High-Density Digital Versatile Disc (HD-DVD) optical disc drive, an internal hard disk drive, a Blu-Ray optical disc drive, a Holographic Digital Data Storage (HDDS) optical disc drive, an external mini-Dual In-Line Memory Module (DIMM), Synchronous Dynamic RAM (SDRAM), external micro-DIMM SDRAM, smartcard memory such as a Subscriber Identity Module (SIM) or a Removable User Identity (RUIM) module, other memory, or any combination thereof. The storage medium 1321 may allow the UE 1300 to access computer-executable instructions, application programs, or the like, stored on transitory or non-transitory memory media, to off-load data or to upload data. An article of manufacture, such as one utilizing a communication system, may be tangibly embodied in the storage medium 1321, which may comprise a device readable medium.

In FIG. 13, the processing circuitry 1301 may be configured to communicate with a network 1343B using the communication subsystem 1331. The network 1343A and the network 1343B may be the same network or networks or different network or networks. The communication subsystem 1331 may be configured to include one or more transceivers used to communicate with the network 1343B. For example, the communication subsystem 1331 may be configured to include one or more transceivers used to communicate with one or more remote transceivers of another device capable of wireless communication such as another WD, UE, or base station of a Radio Access Network (RAN) according to one or more communication protocols, such as IEEE 802.13, Code Division Multiple Access (CDMA), WCDMA, GSM, LTE, Universal Terrestrial RAN (UTRAN), WiMax, or the like. Each transceiver may include a transmitter 1333 and/or a receiver 1335 to implement transmitter or receiver functionality, respectively, appropriate to the RAN links (e.g., frequency allocations and the like). Further, the transmitter 1333 and the receiver 1335 of each transceiver may share circuit components, software, or firmware, or alternatively may be implemented separately.

In the illustrated embodiment, the communication functions of the communication subsystem 1331 may include data communication, voice communication, multimedia communication, short-range communications such as Bluetooth, near-field communication, location-based communication such as the use of the Global Positioning System (GPS) to determine a location, another like communication function, or any combination thereof. For example, the communication subsystem 1331 may include cellular communication, WiFi communication, Bluetooth communication, and GPS communication. The network 1343B may encompass wired and/or wireless networks such as a LAN, a WAN, a computer network, a wireless network, a telecommunications network, another like network, or any combination thereof. For example, the network 1343B may be a cellular network, a WiFi network, and/or a near-field network. A power source 1313 may be configured to provide Alternating Current (AC) or Direct Current (DC) power to components of the UE 1300.

The features, benefits, and/or functions described herein may be implemented in one of the components of the UE 1300 or partitioned across multiple components of the UE 1300. Further, the features, benefits, and/or functions described herein may be implemented in any combination of hardware, software, or firmware. In one example, the communication subsystem 1331 may be configured to include any of the components described herein. Further, the processing circuitry 1301 may be configured to communicate with any of such components over the bus 1302. In another example, any of such components may be represented by program instructions stored in memory that, when executed by the processing circuitry 1301, perform the corresponding functions described herein. In another example, the functionality of any of such components may be partitioned between the processing circuitry 1301 and the communication subsystem 1331. In another example, the non-computationally intensive functions of any of such components may be implemented in software or firmware and the computationally intensive functions may be implemented in hardware.

Figure 14:
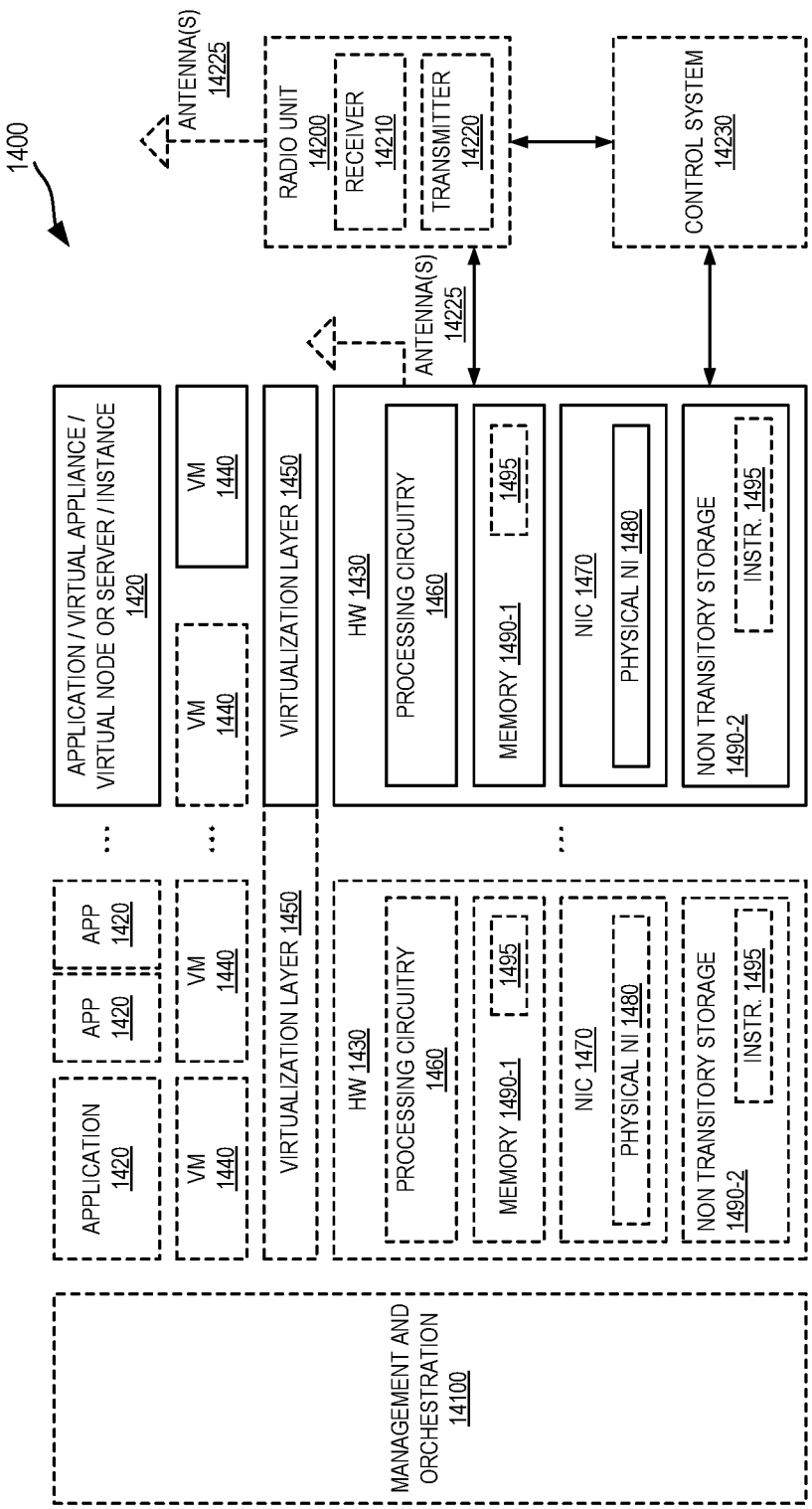
FIG. 14 illustrates a virtualization environment in accordance with some embodiments of the present disclosure.

FIG. 14 is a schematic block diagram illustrating a virtualization environment 1400 in which functions implemented by some embodiments may be virtualized. In the present context, virtualizing means creating virtual versions of apparatuses or devices which may include virtualizing hardware platforms, storage devices, and networking resources. As used herein, virtualization can be applied to a node (e.g., a virtualized base station or a virtualized radio access node) or to a device (e.g., a UE, a WD, or any other type of communication device) or components thereof and relates to an implementation in which at least a portion of the functionality is implemented as one or more virtual components (e.g., via one or more applications, components, functions, virtual machines, or containers executing on one or more physical processing nodes in one or more networks).

In some embodiments, some or all of the functions described herein may be implemented as virtual components executed by one or more virtual machines implemented in one or more virtual environments 1400 hosted by one or more of hardware nodes 1430. Further, in embodiments in which the virtual node is not a radio access node or does not require radio connectivity (e.g., a core network node), then the network node may be entirely virtualized.

The functions may be implemented by one or more applications 1420 (which may alternatively be called software instances, virtual appliances, network functions, virtual nodes, virtual network functions, etc.) operative to implement some of the features, functions, and/or benefits of some of the embodiments disclosed herein. The applications 1420 are run in the virtualization environment 1400 which provides hardware 1430 comprising processing circuitry 1460 and memory 1490. The memory 1490 contains instructions 1495 executable by the processing circuitry 1460 whereby the application 1420 is operative to provide one or more of the features, benefits, and/or functions disclosed herein.

The virtualization environment 1400 comprises general-purpose or special-purpose network hardware devices 1430 comprising a set of one or more processors or processing circuitry 1460, which may be Commercial Off-the-Shelf (COTS) processors, dedicated ASICs, or any other type of processing circuitry including digital or analog hardware components or special purpose processors. Each hardware device 1430 may comprise memory 1490-1 which may be non-persistent memory for temporarily storing instructions 1495 or software executed by the processing circuitry 1460. Each hardware device 1430 may comprise one or more Network Interface Controllers (NICs) 1470, also known as network interface cards, which include a physical network interface 1480. Each hardware device 1430 may also include non-transitory, persistent, machine-readable storage media 1490-2 having stored therein software 1495 and/or instructions executable by the processing circuitry 1460. The software 1495 may include any type of software including software for instantiating one or more virtualization layers 1450 (also referred to as hypervisors), software to execute virtual machines 1440, as well as software allowing it to execute functions, features, and/or benefits described in relation with some embodiments described herein.

The virtual machines 1440, comprise virtual processing, virtual memory, virtual networking or interface, and virtual storage, and may be run by a corresponding virtualization layer 1450 or hypervisor. Different embodiments of the instance of virtual appliance 1420 may be implemented on one or more of the virtual machines 1440, and the implementations may be made in different ways.

During operation, the processing circuitry 1460 executes the software 1495 to instantiate the hypervisor or virtualization layer 1450, which may sometimes be referred to as a Virtual Machine Monitor (VMM). The virtualization layer 1450 may present a virtual operating platform that appears like networking hardware to the virtual machine 1440.

As shown in FIG. 14, the hardware 1430 may be a standalone network node with generic or specific components. The hardware 1430 may comprise an antenna 14225 and may implement some functions via virtualization. Alternatively, the hardware 1430 may be part of a larger cluster of hardware (e.g., such as in a data center or CPE) where many hardware nodes work together and are managed via a Management and Orchestration (MANO) 14100, which, among others, oversees lifecycle management of the applications 1420.

Virtualization of the hardware is in some contexts referred to as Network Function Virtualization (NFV). NFV may be used to consolidate many network equipment types onto industry standard high volume server hardware, physical switches, and physical storage, which can be located in data centers and CPE.

In the context of NFV, the virtual machine 1440 may be a software implementation of a physical machine that runs programs as if they were executing on a physical, non-virtualized machine. Each of the virtual machines 1440, and that part of the hardware 1430 that executes that virtual machine 1440, be it hardware dedicated to that virtual machine 1440 and/or hardware shared by that virtual machine 1440 with others of the virtual machines 1440, forms a separate Virtual Network Element (VNE).

Still in the context of NFV, Virtual Network Function (VNF) is responsible for handling specific network functions that run in one or more virtual machines 1440 on top of the hardware networking infrastructure 1430 and corresponds to the application 1420 in FIG. 14.

In some embodiments, one or more radio units 14200 that each include one or more transmitters 14220 and one or more receivers 14210 may be coupled to the one or more antennas 14225. The radio units 14200 may communicate directly with the hardware nodes 1430 via one or more appropriate network interfaces and may be used in combination with the virtual components to provide a virtual node with radio capabilities, such as a radio access node or a base station.

In some embodiments, some signaling can be effected with the use of a control system 14230, which may alternatively be used for communication between the hardware nodes 1430 and the radio unit 14200.

Figure 15:
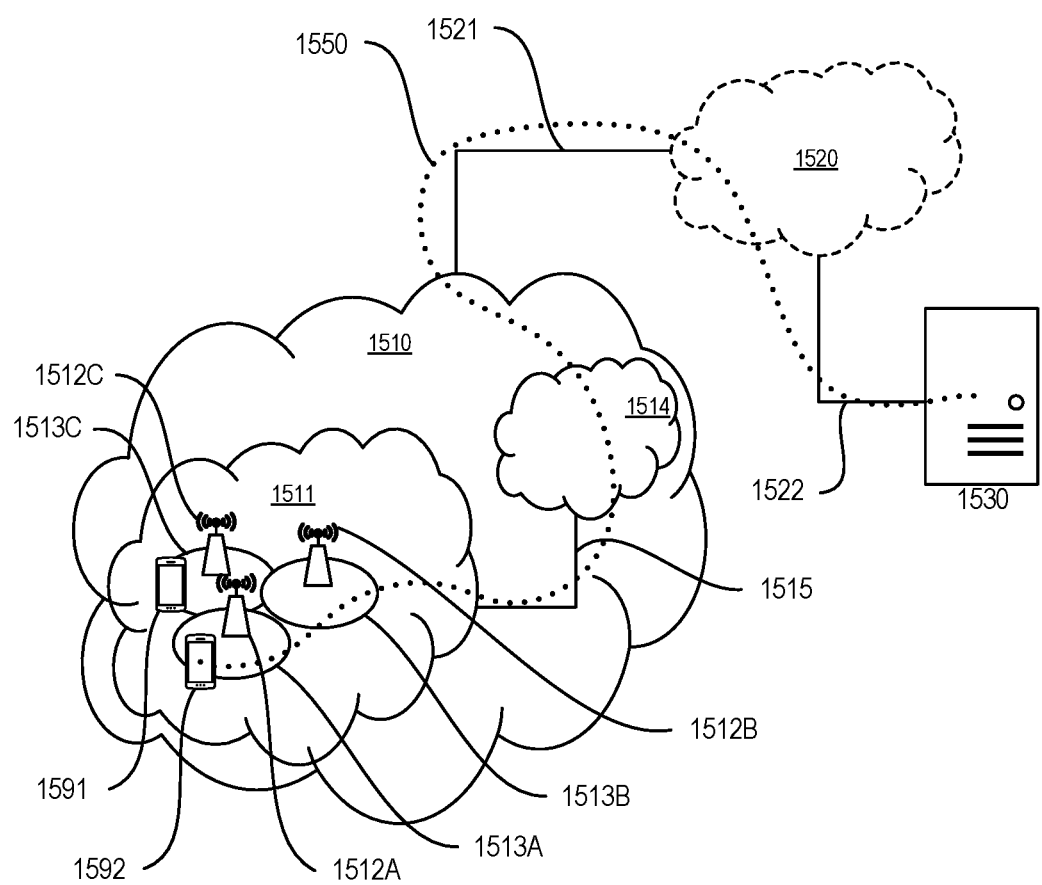
FIG. 15 illustrates a telecommunication network connected via an intermediate network to a host computer in accordance with some embodiments of the present disclosure.

FIG. 15 illustrates a telecommunication network connected via an intermediate network to a host computer in accordance with some embodiments. With reference to FIG. 15, in accordance with an embodiment, a communication system includes a telecommunication network 1510, such as a 3GPP-type cellular network, which comprises an access network 1511, such as a RAN, and a core network 1514. The access network 1511 comprises a plurality of base stations 1512A, 1512B, 1512C, such as NBs, eNBs, gNBs, or other types of wireless APs, each defining a corresponding coverage area 1513A, 1513B, 1513C. Each base station 1512A, 1512B, 1512C is connectable to the core network 1514 over a wired or wireless connection 1515. A first UE 1591 located in coverage area 1513C is configured to wirelessly connect to, or be paged by, the corresponding base station 1512C. A second UE 1592 in coverage area 1513A is wirelessly connectable to the corresponding base station 1512A. While a plurality of UEs 1591, 1592 are illustrated in this example, the disclosed embodiments are equally applicable to a situation where a sole UE is in the coverage area or where a sole UE is connecting to the corresponding base station 1512.

The telecommunication network 1510 is itself connected to a host computer 1530, which may be embodied in the hardware and/or software of a standalone server, a cloud-implemented server, a distributed server, or as processing resources in a server farm. The host computer 1530 may be under the ownership or control of a service provider, or may be operated by the service provider or on behalf of the service provider. Connections 1521 and 1522 between telecommunication network 1510 and the host computer 1530 may extend directly from the core network 1514 to the host computer 1530 or may go via an optional intermediate network 1520. The intermediate network 1520 may be one of, or a combination of more than one of, a public, private, or hosted network; the intermediate network 1520, if any, may be a backbone network or the Internet; in particular, the intermediate network 1520 may comprise two or more sub-networks (not shown).

The communication system of FIG. 15 as a whole enables connectivity between the connected UEs 1591, 1592 and the host computer 1530. The connectivity may be described as an Over-the-Top (OTT) connection 1550. The host computer 1530 and the connected UEs 1591, 1592 are configured to communicate data and/or signaling via the OTT connection 1550, using the access network 1511, the core network 1514, any intermediate network 1520, and possible further infrastructure (not shown) as intermediaries. The OTT connection 1550 may be transparent in the sense that the participating communication devices through which the OTT connection 1550 passes are unaware of routing of uplink and downlink communications. For example, the base station 1512 may not or need not be informed about the past routing of an incoming downlink communication with data originating from the host computer 1530 to be forwarded (e.g., handed over) to a connected UE 1591. Similarly, the base station 1512 need not be aware of the future routing of an outgoing uplink communication originating from the UE 1591 towards the host computer 1530.

Figure 16:
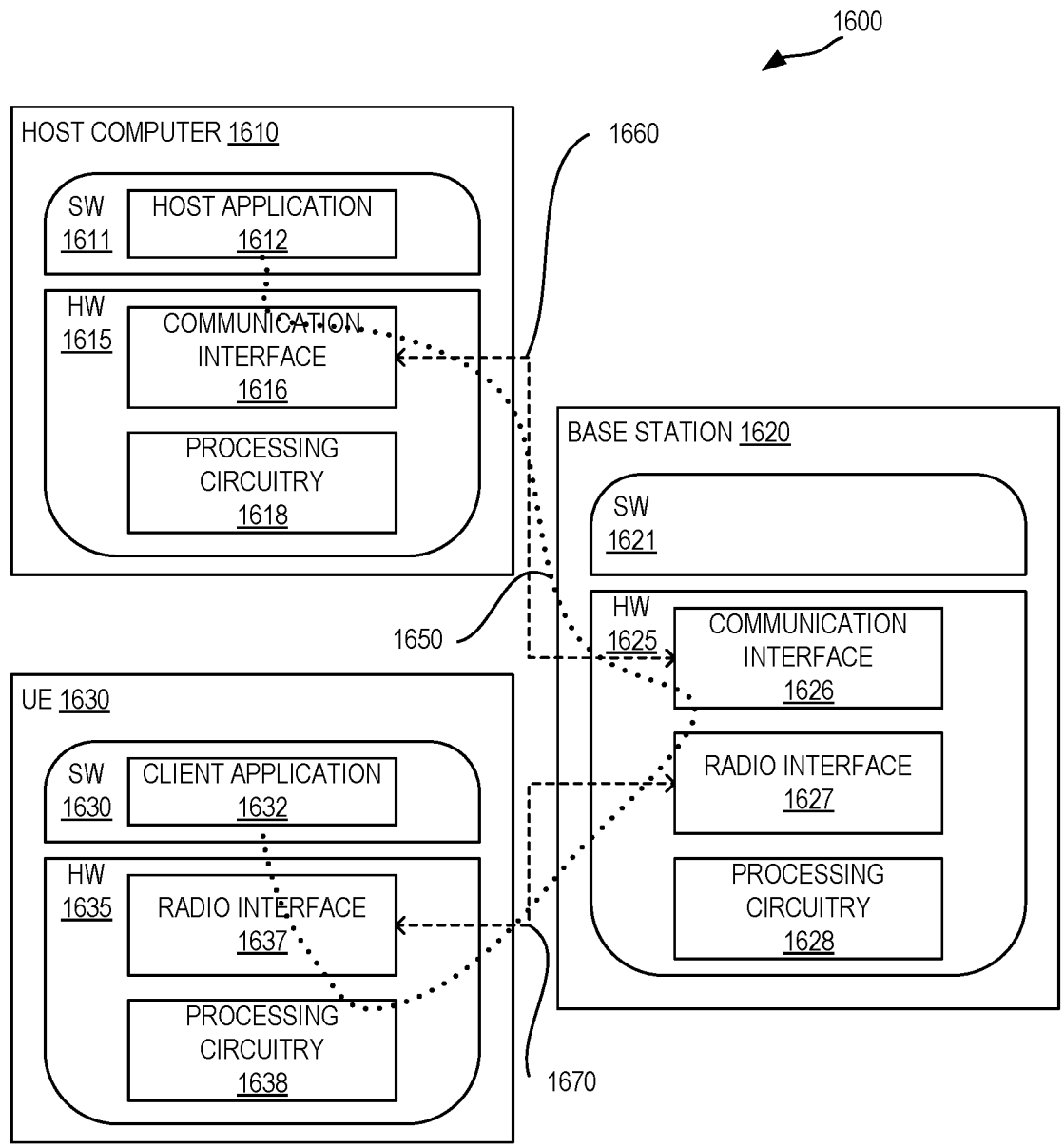
FIG. 16 illustrates a host computer communicating via a base station with a UE over a partially wireless connection in accordance with some embodiments of the present disclosure.

Example implementations, in accordance with an embodiment, of the UE, base station, and host computer discussed in the preceding paragraphs will now be described with reference to FIG. 16. FIG. 16 illustrates a host computer communicating via a base station with a user equipment over a partially wireless connection in accordance with some embodiments. In a communication system 1600, a host computer 1610 comprises hardware 1615 including a communication interface 1616 configured to set up and maintain a wired or wireless connection with an interface of a different communication device of the communication system 1600. The host computer 1610 further comprises processing circuitry 1618, which may have storage and/or processing capabilities. In particular, the processing circuitry 1618 may comprise one or more programmable processors, ASICs, FPGAs, or combinations of these (not shown) adapted to execute instructions. The host computer 1610 further comprises software 1611, which is stored in or accessible by the host computer 1610 and executable by the processing circuitry 1618. The software 1611 includes a host application 1612. The host application 1612 may be operable to provide a service to a remote user, such as a UE 1630 connecting via an OTT connection 1650 terminating at the UE 1630 and the host computer 1610. In providing the service to the remote user, the host application 1612 may provide user data which is transmitted using the OTT connection 1650.

The communication system 1600 further includes a base station 1620 provided in a telecommunication system and comprising hardware 1625 enabling it to communicate with the host computer 1610 and with the UE 1630. The hardware 1625 may include a communication interface 1626 for setting up and maintaining a wired or wireless connection with an interface of a different communication device of the communication system 1600, as well as a radio interface 1627 for setting up and maintaining at least a wireless connection 1670 with the UE 1630 located in a coverage area (not shown in FIG. 16) served by the base station 1620. The communication interface 1626 may be configured to facilitate a connection 1660 to the host computer 1610. The connection 1660 may be direct or it may pass through a core network (not shown in FIG. 16) of the telecommunication system and/or through one or more intermediate networks outside the telecommunication system. In the embodiment shown, the hardware 1625 of the base station 1620 further includes processing circuitry 1628, which may comprise one or more programmable processors, ASICs, FPGAs, or combinations of these (not shown) adapted to execute instructions. The base station 1620 further has software 1621 stored internally or accessible via an external connection.

The communication system 1600 further includes the UE 1630 already referred to. The UE's 1630 hardware 1635 may include a radio interface 1637 configured to set up and maintain a wireless connection 1670 with a base station serving a coverage area in which the UE 1630 is currently located. The hardware 1635 of the UE 1630 further includes processing circuitry 1638, which may comprise one or more programmable processors, ASICs, FPGAs, or combinations of these (not shown) adapted to execute instructions. The UE 1630 further comprises software 1631, which is stored in or accessible by the UE 1630 and executable by the processing circuitry 1638. The software 1631 includes a client application 1632. The client application 1632 may be operable to provide a service to a human or non-human user via the UE 1630, with the support of the host computer 1610. In the host computer 1610, the executing host application 1612 may communicate with the executing client application 1632 via the OTT connection 1650 terminating at the UE 1630 and the host computer 1610. In providing the service to the user, the client application 1632 may receive request data from the host application 1612 and provide user data in response to the request data. The OTT connection 1650 may transfer both the request data and the user data. The client application 1632 may interact with the user to generate the user data that it provides.

It is noted that the host computer 1610, the base station 1620, and the UE 1630 illustrated in FIG. 16 may be similar or identical to the host computer 1530, one of the base stations 1512A, 1512B, 1512C, and one of the UEs 1591, 1592 of FIG. 15, respectively. This is to say, the inner workings of these entities may be as shown in FIG. 16 and independently, the surrounding network topology may be that of FIG. 15.

In FIG. 16, the OTT connection 1650 has been drawn abstractly to illustrate the communication between the host computer 1610 and the UE 1630 via the base station 1620 without explicit reference to any intermediary devices and the precise routing of messages via these devices. The network infrastructure may determine the routing, which may be configured to hide from the UE 1630 or from the service provider operating the host computer 1610, or both. While the OTT connection 1650 is active, the network infrastructure may further take decisions by which it dynamically changes the routing (e.g., on the basis of load balancing consideration or reconfiguration of the network).

The wireless connection 1670 between the UE 1630 and the base station 1620 is in accordance with the teachings of the embodiments described throughout this disclosure. One or more of the various embodiments improve the performance of OTT services provided to the UE 1630 using the OTT connection 1650, in which the wireless connection 1670 forms the last segment. More precisely, the teachings of these embodiments may improve, e.g., throughput and power consumption (e.g., via reduced signaling overhead) and thereby provide benefits such as, e.g., reduced user waiting time, relaxed restriction on file size, better responsiveness, and/or extended battery lifetime.

A measurement procedure may be provided for the purpose of monitoring data rate, latency, and other factors on which the one or more embodiments improve. There may further be an optional network functionality for reconfiguring the OTT connection 1650 between the host computer 1610 and the UE 1630, in response to variations in the measurement results. The measurement procedure and/or the network functionality for reconfiguring the OTT connection 1650 may be implemented in the software 1611 and the hardware 1615 of the host computer 1610 or in the software 1631 and the hardware 1635 of the UE 1630, or both. In some embodiments, sensors (not shown) may be deployed in or in association with communication devices through which the OTT connection 1650 passes; the sensors may participate in the measurement procedure by supplying values of the monitored quantities exemplified above, or supplying values of other physical quantities from which the software 1611, 1631 may compute or estimate the monitored quantities. The reconfiguring of the OTT connection 1650 may include message format, retransmission settings, preferred routing, etc.; the reconfiguring need not affect the base station 1620, and it may be unknown or imperceptible to the base station 1620. Such procedures and functionalities may be known and practiced in the art. In certain embodiments, measurements may involve proprietary UE signaling facilitating the host computer 1610's measurements of throughput, propagation times, latency, and the like. The measurements may be implemented in that the software 1611 and 1631 causes messages to be transmitted, in particular empty or 'dummy' messages, using the OTT connection 1650 while it monitors propagation times, errors, etc.

FIG. 17 is a flowchart illustrating a method implemented in a communication system, in accordance with one embodiment. The communication system includes a host computer, a base station, and a UE which may be those described with reference to FIGS. 15 and 16. For simplicity of the present disclosure, only drawing references to FIG. 17 will be included in this section. In step 1710, the host computer provides user data. In sub-step 1711 (which may be optional) of step 1710, the host computer provides the user data by executing a host application. In step 1720, the host computer initiates a transmission carrying the user data to the UE. In step 1730 (which may be optional), the base station transmits to the UE the user data which was carried in the transmission that the host computer initiated, in accordance with the teachings of the embodiments described throughout this disclosure. In step 1740 (which may also be optional), the UE executes a client application associated with the host application executed by the host computer.

FIG. 18 is a flowchart illustrating a method implemented in a communication system, in accordance with one embodiment. The communication system includes a host computer, a base station, and a UE which may be those described with reference to FIGS. 15 and 16. For simplicity of the present disclosure, only drawing references to FIG. 18 will be included in this section. In step 1810 of the method, the host computer provides user data. In an optional sub-step (not shown) the host computer provides the user data by executing a host application. In step 1820, the host computer initiates a transmission carrying the user data to the UE. The transmission may pass via the base station, in accordance with the teachings of the embodiments described throughout this disclosure. In step 1830 (which may be optional), the UE receives the user data carried in the transmission.

FIG. 19 is a flowchart illustrating a method implemented in a communication system, in accordance with one embodiment. The communication system includes a host computer, a base station, and a UE which may be those described with reference to FIGS. 15 and 16. For simplicity of the present disclosure, only drawing references to FIG. 19 will be included in this section. In step 1910 (which may be optional), the UE receives input data provided by the host computer. Additionally or alternatively, in step 1920, the UE provides user data. In sub-step 1921 (which may be optional) of step 1920, the UE provides the user data by executing a client application. In sub-step 1911 (which may be optional) of step 1910, the UE executes a client application which provides the user data in reaction to the received input data provided by the host computer. In providing the user data, the executed client application may further consider user input received from the user. Regardless of the specific manner in which the user data was provided, the UE initiates, in sub-step 1930 (which may be optional), transmission of the user data to the host computer. In step 1940 of the method, the host computer receives the user data transmitted from the UE, in accordance with the teachings of the embodiments described throughout this disclosure.

FIG. 20 is a flowchart illustrating a method implemented in a communication system, in accordance with one embodiment. The communication system includes a host computer, a base station, and a UE which may be those described with reference to FIGS. 15 and 16. For simplicity of the present disclosure, only drawing references to FIG. 20 will be included in this section. In step 2010 (which may be optional), in accordance with the teachings of the embodiments described throughout this disclosure, the base station receives user data from the UE. In step 2020 (which may be optional), the base station initiates transmission of the received user data to the host computer. In step 2030 (which may be optional), the host computer receives the user data carried in the transmission initiated by the base station.

Figure 21:
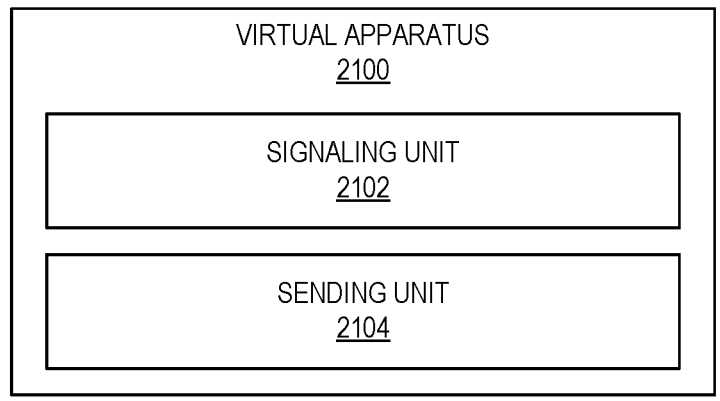
FIGS. 21 and 22 illustrate two example virtual apparatuses that operate in accordance with at least some embodiments of the present disclosure.

FIG. 21 illustrates a schematic block diagram of an apparatus 2100 in a wireless network (for example, the wireless network shown in FIG. 12). In FIG. 21, the apparatus may be implemented in a network node (e.g., the network node 1260 shown in FIG. 12). The apparatus 2100 is operable to carry out the example method described with reference to FIG. 10 and/or 10 and possibly any other processes or methods disclosed herein. It is also to be understood that the method of FIG. 10 and/or 10 is not necessarily carried out solely by the apparatus 2100. At least some operations of the method can be performed by one or more other entities.

The virtual apparatus 2100 may comprise processing circuitry, which may include one or more microprocessor or microcontrollers, as well as other digital hardware, which may include DSPs, special-purpose digital logic, and the like. The processing circuitry may be configured to execute program code stored in memory, which may include one or several types of memory such as ROM, RAM, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause a signaling unit 2102, a sending unit 2104, and any other suitable units of the apparatus 2100 to perform corresponding functions according one or more embodiments of the present disclosure.

As illustrated in FIG. 21, the apparatus 2100 includes the signaling unit 2102 and the sending unit 2104. The signaling unit 2102 is configured to signal, to a wireless device, an indication of one of the two or more predefined TPC mapping tables to be used by the wireless device (e.g., as in FIG. 10) or signal, to the wireless device, one or more criteria to be used by the wireless device to select the one of the two or more predefined TPC mapping tables to be used by the wireless device (e.g., as in FIG. 11). The sending unit 2104 is configured to send a TPC command to the wireless device (e.g., as described in FIG. 10 or FIG. 11).

Figure 22:
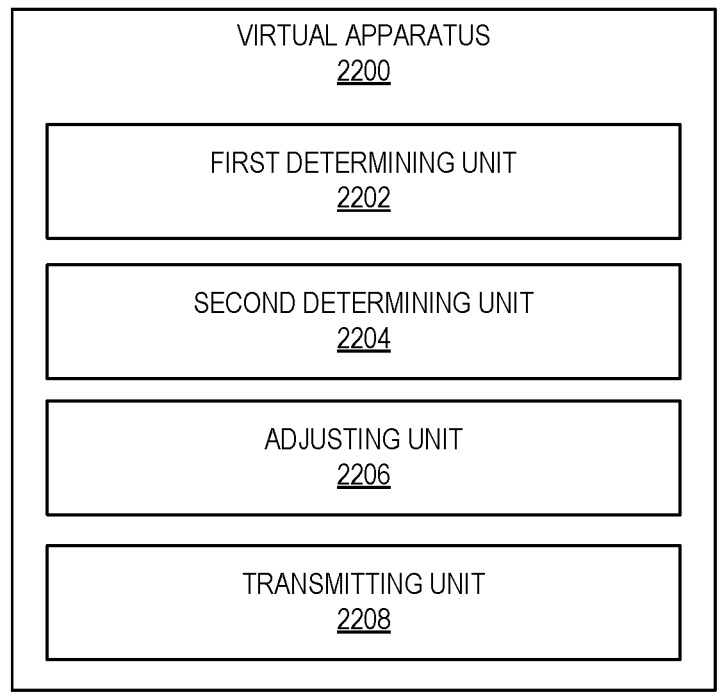

FIG. 22 illustrates a schematic block diagram of an apparatus 2200 in a wireless network (for example, the wireless network shown in FIG. 12). The apparatus may be implemented in a wireless device (e.g., the WD 1210 shown in FIG. 12). The apparatus 2200 is operable to carry out the example method described with reference to FIG. 10 and/or 11 and possibly any other processes or methods disclosed herein. It is also to be understood that the method of FIG. 10 and/or 11 is not necessarily carried out solely by the apparatus 2200. At least some operations of the method can be performed by one or more other entities.

The virtual apparatus 2200 may comprise processing circuitry, which may include one or more microprocessor or microcontrollers, as well as other digital hardware, which may include DSPs, special-purpose digital logic, and the like. The processing circuitry may be configured to execute program code stored in memory, which may include one or several types of memory such as ROM, RAM, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause a first determining unit 2202, a second determining unit 2204, an adjusting unit 2206, and a transmitting unit 2208, and any other suitable units of the apparatus 2200 to perform corresponding functions according one or more embodiments of the present disclosure.

As illustrated in FIG. 22, the apparatus 2200 includes the first determining unit 2202, the second determining unit 2204, the adjusting unit 2206, and the transmitting unit 2208. The first determining unit 2202 is configured to determine one of two or more predefined TPC mapping tables to be used. The second determining unit 2204 is configured to determine a power adjustment value based on a received TPC command using the determined TPC mapping table. The adjusting unit 2206 is configured to adjust a transmit power of the apparatus 2200 (or the wireless device in which the apparatus 2200 is comprised) based on the determined power adjustment value. The transmitting unit 2208 is configured to transmit an uplink transmission using the adjusted transmit power.

The term unit may have conventional meaning in the field of electronics, electrical devices, and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

A number of non-limiting example embodiments are as follows:

Group A Embodiments

Embodiment 1: A method performed by a wireless device for fast uplink power control, the method comprising: determining one of two or more predefined TPC mapping tables to be used by the wireless device; determining a power adjustment value based on a TPC command received from a network node using the one of the two or more predefined TPC mapping tables; and adjusting a transmit power of the wireless device based on the power adjustment value.

Embodiment 2: The method of embodiment 1 further comprising: receiving, from the network node, an indication of the one of two or more predefined TPC mapping tables to be used by the wireless device; wherein determining the one of two or more predefined TPC mapping tables to be used by the wireless device comprises determining the one of two or more predefined TPC mapping tables to be used by the wireless device based on the indication received from the network node.

Embodiment 3: The method of embodiment 1 wherein determining the one of two or more predefined TPC mapping tables to be used by the wireless device comprises determining the one of two or more predefined TPC mapping tables to be used by the wireless device based on one or more predefined criteria.

Embodiment 4: The method of embodiment 1 further comprising: receiving one or more criteria from a network node; wherein determining the one of two or more predefined TPC mapping tables to be used by the wireless device comprises determining the one of two or more predefined TPC mapping tables to be used by the wireless device based on the one or more criteria received from the network node.

Embodiment 5: The method of any one of embodiments 1 to 4 wherein the two or more predefined TPC mapping tables comprise a first TPC mapping table and a second TPC mapping table that is different than the first TPC mapping table.

Embodiment 6: The method of any one of embodiments 1 to 4, wherein the first TPC mapping table is an existing table defined in 3GPP LTE and the second TPC mapping table is a new table.

Embodiment 7: The method of any one of embodiments 1 to 6, wherein the first TPC mapping table and the second TPC mapping table have a same number of entries.

Embodiment 8: The method of any one of embodiments 1 to 7 wherein: the first TPC mapping table has four entries corresponding to four different power adjustment values defined by the first TPC mapping table; and the second TPC mapping table has four entries corresponding to four different power adjustment values defined by the second TPC mapping table, at least one of which is greater than all of the four power adjustment values defined by the first TPC mapping table.

Embodiment 9: The method of any one of embodiments 1 to 8 wherein: the first TPC mapping table has four entries corresponding to four different power adjustment values defined by the first TPC mapping table; and the second TPC mapping table has four entries corresponding to four different power adjustment values defined by the second TPC mapping table, at least one of which is less than all of the four power adjustment values defined by the first TPC mapping table.

Embodiment 10: The method of any one of embodiments 1 to 6 wherein the first TPC mapping table has a first number of entries and the second TPC mapping table has a second number of entries that is not equal to the first number of entries.

Embodiment 11: The method of any one of embodiments 1 to 6 and 10 wherein: the first TPC mapping table has four entries corresponding to four different power adjustment values defined by the first TPC mapping table; and the second TPC mapping table has eight entries corresponding to eight different power adjustment values defined by the second TPC mapping table, at least one of which is greater than all of the four power adjustment values defined by the first TPC mapping table.

Embodiment 12: The method of any one of embodiments 1 to 6, 10, and 11 wherein: the first TPC mapping table has four entries corresponding to four different power adjustment values defined by the first TPC mapping table; and the second TPC mapping table has eight entries corresponding to eight different power adjustment values defined by the second TPC mapping table, at least one of which is less than all of the four power adjustment values defined by the first TPC mapping table.

Embodiment 13: The method of any one of embodiments 1 to 6 and 10 to 12 wherein the first TPC mapping table is a subset of the second TPC mapping table.

Embodiment 14: The method of any one of embodiments 1 to 13 wherein the first and second TPC mapping tables define accumulated power adjustment values.

Embodiment 15: The method of any one of embodiments 1 to 13 wherein the first and second TPC mapping tables define non-accumulated (i.e., absolute) power adjustment values.

Embodiment 16: The method of any one of embodiments 1 to 15 further comprising receiving, from the network node, downlink control information comprising the TPC command.

Embodiment 17: The method of embodiment 16 wherein a pathloss compensation factor is jointly indicated with the power adjustment value using the same field in the downlink control information.

Embodiment 18: The method of any of the previous embodiments, further comprising: providing user data; and forwarding the user data to a host computer via the transmission to the base station.

Group B Embodiments

Embodiment 19: A method performed by a network node (e.g., a base station) to provide fast uplink power control, the method comprising: signaling, from the network node to a wireless device, an indication of one of two or more predefined TPC mapping tables to be used by the wireless device or one or more criteria to be used by the wireless device to select the one of the two or more predefined mapping tables to be used by the wireless device; and sending, from the network node to the wireless device, a TPC command to be mapped to a power adjustment value by the wireless device using the one of the two or more predefined TPC mapping tables.

Embodiment 20: The method of embodiment 19 wherein signaling the indication of the one of two or more predefined TPC mapping tables to be used by the wireless device or the one or more criteria to be used by the wireless device to select the one of the two or more predefined mapping tables to be used by the wireless device comprises: signaling, from the network node to the wireless device, the indication of the one of two or more predefined TPC mapping tables to be used by the wireless device.

Embodiment 21: The method of embodiment 19 wherein signaling the indication of the one of two or more predefined TPC mapping tables to be used by the wireless device or the one or more criteria to be used by the wireless device to select the one of the two or more predefined mapping tables to be used by the wireless device comprises: signaling, from the network node to the wireless device, the one or more criteria to be used by the wireless device to select the one of the two or more predefined mapping tables.

Embodiment 22: The method of any one of embodiments 19 to 21 wherein the two or more predefined TPC mapping tables comprise a first TPC mapping table and a second TPC mapping table that is different than the first TPC mapping table.

Embodiment 23: The method of any one of embodiments 19 to 22, wherein the first TPC mapping table is an existing table defined in 3GPP LTE and the second TPC mapping table is a new table.

Embodiment 24: The method of any one of embodiments 19 to 23, wherein the first TPC mapping table and the second TPC mapping table have a same number of entries.

Embodiment 25: The method of any one of embodiments 19 to 24 wherein: the first TPC mapping table has four entries corresponding to four different power adjustment values defined by the first TPC mapping table; and the second TPC mapping table has four entries corresponding to four different power adjustment values defined by the second TPC mapping table, at least one of which is greater than all of the four power adjustment values defined by the first TPC mapping table.

Embodiment 26: The method of any one of embodiments 19 to 25 wherein: the first TPC mapping table has four entries corresponding to four different power adjustment values defined by the first TPC mapping table; and the second TPC mapping table has four entries corresponding to four different power adjustment values defined by the second TPC mapping table, at least one of which is less than all of the four power adjustment values defined by the first TPC mapping table.

Embodiment 27: The method of any one of embodiments 19 to 23, wherein the first TPC mapping table has a first number of entries and the second TPC mapping table has a second number of entries that is not equal to the first number of entries.

Embodiment 28: The method of any one of embodiments 19 to 23 and 27 wherein: the first TPC mapping table has four entries corresponding to four different power adjustment values defined by the first TPC mapping table; and the second TPC mapping table has eight entries corresponding to eight different power adjustment values defined by the second TPC mapping table, at least one of which is greater than all of the four power adjustment values defined by the first TPC mapping table.

Embodiment 29: The method of any one of embodiments 19 to 23, 27, and 28 wherein: the first TPC mapping table has four entries corresponding to four different power adjustment values defined by the first TPC mapping table; and the second TPC mapping table has eight entries corresponding to eight different power adjustment values defined by the second TPC mapping table, at least one of which is less than all of the four power adjustment values defined by the first TPC mapping table.

Embodiment 30: The method of any one of embodiments 19 to 23 and 27 to 29 wherein the first TPC mapping table is a subset of the second TPC mapping table.

Embodiment 31: The method of any one of embodiments 19 to 30 wherein the first and second TPC mapping tables define accumulated power adjustment values.

Embodiment 32: The method of any one of embodiments 19 to 30 wherein the first and second TPC mapping tables define non-accumulated (i.e., absolute) power adjustment values.

Embodiment 33: The method of any of embodiments 19 to 32 wherein sending the TPC command comprises sending, from the network node to the wireless device, downlink control information comprising the TPC command.

Embodiment 34: The method of embodiment 33 wherein a pathloss compensation factor is jointly indicated with the power adjustment value using the same field in the downlink control information.

Embodiment 35: The method of any of the previous embodiments, further comprising: obtaining user data; and forwarding the user data to a host computer or a wireless device.

Group C Embodiments

Embodiment 36: A wireless device for fast uplink power control, the wireless device comprising: processing circuitry configured to perform any of the steps of any of the Group A and/or UE steps in Group D embodiments; and power supply circuitry configured to supply power to the wireless device.

Embodiment 37: A network node (e.g., a base station) for fast uplink power control, the network node (e.g., a base station) comprising: processing circuitry configured to perform any of the steps of any of the Group B and/or network node steps in Group D embodiments; power supply circuitry configured to supply power to the wireless device.

Embodiment 38: A User Equipment (UE) for fast uplink power control, the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A and/or UE steps in Group D embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 39: A communication system including a host computer comprising: processing circuitry configured to provide user data; and a communication interface configured to forward the user data to a cellular network for transmission to a User Equipment (UE), wherein the cellular network comprises a network node (e.g., a base station) having a radio interface and processing circuitry, the network node's processing circuitry configured to perform any of the steps of any of the Group B and/or network node steps in Group D embodiments.

Embodiment 40: The communication system of the previous embodiment further including the network node (e.g., a base station).

Embodiment 41: The communication system of the previous 2 embodiments, further including the UE, wherein the UE is configured to communicate with the network node (e.g., a base station).

Embodiment 42: The communication system of the previous 3 embodiments, wherein: the processing circuitry of the host computer is configured to execute a host application, thereby providing the user data; and the UE comprises processing circuitry configured to execute a client application associated with the host application.

Embodiment 43: A method implemented in a communication system including a host computer, a network node (e.g., a base station) and a User Equipment (UE), the method comprising: at the host computer, providing user data; and at the host computer, initiating a transmission carrying the user data to the UE via a cellular network comprising the network node (e.g., a base station), wherein the network node (e.g., a base station) performs any of the steps of any of the Group B and/or network node steps in Group D embodiments.

Embodiment 44: The method of the previous embodiment, further comprising, at the network node (e.g., a base station), transmitting the user data.

Embodiment 45: The method of the previous 2 embodiments, wherein the user data is provided at the host computer by executing a host application, the method further comprising, at the UE, executing a client application associated with the host application.

Embodiment 46: A User Equipment (UE) configured to communicate with a network node (e.g., a base station), the UE comprising a radio interface and processing circuitry configured to perform the method of the previous 3 embodiments.

Embodiment 47: A communication system including a host computer comprising: processing circuitry configured to provide user data; and a communication interface configured to forward user data to a cellular network for transmission to a User Equipment (UE), wherein the UE comprises a radio interface and processing circuitry, the UE's components configured to perform any of the steps of any of the Group A and/or UE steps in Group D embodiments.

Embodiment 48: The communication system of the previous embodiment, wherein the cellular network further includes a network node (e.g., a base station) configured to communicate with the UE.

Embodiment 49: The communication system of the previous 2 embodiments, wherein: the processing circuitry of the host computer is configured to execute a host application, thereby providing the user data; and the UE's processing circuitry is configured to execute a client application associated with the host application.

Embodiment 50: A method implemented in a communication system including a host computer, a network node (e.g., a base station) and a User Equipment (UE), the method comprising: at the host computer, providing user data; and at the host computer, initiating a transmission carrying the user data to the UE via a cellular network comprising the network node (e.g., a base station), wherein the UE performs any of the steps of any of the Group A and/or UE steps in Group D embodiments.

Embodiment 51: The method of the previous embodiment, further comprising at the UE, receiving the user data from the network node (e.g., a base station).

Embodiment 52: A communication system including a host computer comprising: communication interface configured to receive user data originating from a transmission from a User Equipment (UE) to a network node (e.g., a base station), wherein the UE comprises a radio interface and processing circuitry, the UE's processing circuitry configured to perform any of the steps of any of the Group A and/or UE steps in Group D embodiments.

Embodiment 53: The communication system of the previous embodiment, further including the UE.

Embodiment 54: The communication system of the previous 2 embodiments, further including the base station, wherein the base station comprises a radio interface configured to communicate with the UE and a communication interface configured to forward to the host computer the user data carried by a transmission from the UE to the network node (e.g., a base station).

Embodiment 55: The communication system of the previous 3 embodiments, wherein: the processing circuitry of the host computer is configured to execute a host application; and the UE's processing circuitry is configured to execute a client application associated with the host application, thereby providing the user data.

Embodiment 56: The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Embodiment 57: A method implemented in a communication system including a host computer, a network node (e.g., a base station) and a User Equipment (UE), the method comprising: at the host computer, receiving user data transmitted to the network node (e.g., a base station) from the UE, wherein the UE performs any of the steps of any of the Group A and/or UE steps in Group D embodiments.

Embodiment 58: The method of the previous embodiment, further comprising, at the UE, providing the user data to the network node (e.g., a base station).

Embodiment 59: The method of the previous 2 embodiments, further comprising: at the UE, executing a client application, thereby providing the user data to be transmitted; and at the host computer, executing a host application associated with the client application.

Embodiment 60: The method of the previous 3 embodiments, further comprising: at the UE, executing a client application; and at the UE, receiving input data to the client application, the input data being provided at the host computer by executing a host application associated with the client application, wherein the user data to be transmitted is provided by the client application in response to the input data.

Embodiment 61: A communication system including a host computer comprising a communication interface configured to receive user data originating from a transmission from a User Equipment (UE) to a network node (e.g., a base station), wherein the network node (e.g., a base station) comprises a radio interface and processing circuitry, the network node's processing circuitry configured to perform any of the steps of any of the Group B and/or network node steps in Group D embodiments.

Embodiment 62: The communication system of the previous embodiment further including the network node (e.g., a base station).

Embodiment 63: The communication system of the previous 2 embodiments, further including the UE, wherein the UE is configured to communicate with the network node (e.g., a base station).

Embodiment 64: The communication system of the previous 3 embodiments, wherein: the processing circuitry of the host computer is configured to execute a host application; the UE is configured to execute a client application associated with the host application, thereby providing the user data to be received by the host computer.

Embodiment 65: A method implemented in a communication system including a host computer, a network node (e.g., a base station) and a User Equipment (UE), the method comprising: at the host computer, receiving, from the network node (e.g., a base station), user data originating from a transmission which the network node (e.g., a base station) has received from the UE, wherein the UE performs any of the steps of any of the Group A and/or UE steps in Group D embodiments.

Embodiment 66: The method of the previous embodiment, further comprising at the network node (e.g., a base station), receiving the user data from the UE.

Embodiment 67: The method of the previous 2 embodiments, further comprising at the network node (e.g., a base station), initiating a transmission of the received user data to the host computer.

Group D Embodiments

Embodiment 68: A method of signaling for fast uplink power control in a wireless network, the method comprising at least one of: determining, by a network node, a first and a second mapping table for mapping a transmit power control command bit field in at least one Downlink Control Information (DCI) format to a set of power adjustment values; signaling, by the network node to a UE, one of the two mapping tables to use; sending, by the network node to the UE, a DCI containing at least a Transmit Power Control (TPC) command; and adjusting, by the UE, its transmit power by an amount according to the TPC command and the signaled mapping table.

Embodiment 69: The method of embodiment 68, wherein the first mapping table is different from the second mapping tables.

Embodiment 70: The method of embodiments 68 or 69, wherein the first mapping table is an existing table in LTE and the second table is a new table.

Embodiment 71: The method of any one of embodiments 68 to 70, wherein the first and the second table have a same number of entries.

Embodiment 72: The method of embodiments 68 to 71, wherein the second mapping table has four entries and at least one entry of power adjustment value is greater than any power adjustment entry in the first table.

Embodiment 73: The method of embodiments 68 to 71, wherein the second table has four entries and at least one entry of power adjustment value is smaller than any power adjustment entry in the first table.

Embodiment 74: The method of embodiments 68 to 70, wherein the first and the second table have different number of entries.

Embodiment 75: The method of embodiments 68, 69, and 74, wherein the second table has eight entries and at least one entry of power adjustment value is smaller than or greater than any power adjustment entry in the first table.

Embodiment 76: The method of embodiment 74, wherein the first table is a subset of the second table.

Embodiment 77: The method of embodiments 68 to 76, wherein the power adjustment values in the first and the second table are accumulated values.

Embodiment 78: The method of embodiments 68 to 76, wherein the power adjustment values in the first and the second table are absolute or non-accumulated values.

Embodiment 79: The method of any of embodiments 68 to 78, wherein a pathloss compensation factor is jointly indicated with the power adjustment value using the same field in the DCI.

At least some of the following abbreviations may be used in this disclosure. If there is an inconsistency between abbreviations, preference should be given to how it is used above. If listed multiple times below, the first listing should be preferred over any subsequent listing(s).

2G Second Generation
3G Third Generation
3GPP Third Generation Partnership Project
4G Fourth Generation
5G Fifth Generation
AC Alternating Current
ACK Acknowledgement
AP Access Point
ASIC Application Specific Integrated Circuit
ATM Asynchronous Transfer Mode
BS Base Station
BSC Base Station Controller
BTS Base Transceiver Station
CD Compact Disk
CDF Cumulative Distribution Function
CDMA Code Division Multiple Access
COTS Commercial Off-the-Shelf
CPE Customer Premise Equipment
CPU Central Processing Unit
D2D Device-to-Device
DAS Distributed Antenna System
dB Decibel
dBm Decibels with reference to 1 Milliwatt
DC Direct Current
DCI Downlink Control Information
DFT Discrete Fourier Transform
DIMM Dual In-Line Memory Module
DSP Digital Signal Processor
DVD Digital Video Disk
EEPROM Electrically Erasable Programmable Read Only Memory
eMTC Enhanced Machine Type Communication
eNB Enhanced or Evolved Node B
EPDCCH Enhanced Physical Downlink Control Channel
EPROM Erasable Programmable Read Only Memory
E-SMLC Evolved Serving Mobile Location Center
FDD Frequency Division Duplex
FPGA Field Programmable Gate Array
gNB New Radio Base Station
GPS Global Positioning System
GSM Global System for Mobile Communications
HARQ Hybrid Automatic Repeat Request
HDDS Holographic Digital Data Storage
HD-DVD High-Density Digital Versatile Disc
I/O Input and Output
IoT Internet of Things
IP Internet Protocol
km/h Kilometers per Hour
LAA License Assisted Access
LAN Local Area Network
LEE Laptop Embedded Equipment
LME Laptop Mounted Equipment
LOS Line of Sight
LTE Long Term Evolution
M2M Machine-to-Machine
MANO Management and Orchestration
MCE Multi-Cell/Multicast Coordination Entity
MCS Modulation and Coding Scheme
MDT Minimization of Drive Tests
MIMO Multiple Input Multiple Output
MME Mobility Management Entity
ms Millisecond
MSC Mobile Switching Center
MSR Multi-Standard Radio
MTC Machine Type Communication
mW Milliwatt
NACK Negative Acknowledgement
NB-IoT Narrowband Internet of Things
NFV Network Function Virtualization
NIC Network Interface Controller
NR New Radio
O&M Operation and Maintenance
OFDM Orthogonal Frequency Division Multiplexing
OSS Operations Support System
OTT Over-the-Top
PDA Personal Digital Assistant
PDCCH Physical Downlink Control Channel
PDSCH Physical Downlink Shared Channel
PRACH Physical Random Access Channel
PROM Programmable Read Only Memory
PSTN Public Switched Telephone Networks
PUCCH Physical Uplink Control Channel
PUSCH Physical Uplink Shared Channel
RAID Redundant Array of Independent Disks
RAM Random Access Memory
RAN Radio Access Network
RAT Radio Access Technology
RB Resource Block
RF Radio Frequency
RMa-AV Rural Macro for Aerial Vehicles
RNC Radio Network Controller
ROM Read Only Memory
RRH Remote Radio Head
RRU Remote Radio Unit
RSRP Reference Signal Received Power
RSRQ Reference Signal Received Quality
RSSI Reference Signal Strength Indicator
RUIM Removable User Identity SDRAM Synchronous Dynamic Random Access Memory
SIM Subscriber Identity Module
SINR Signal to Interference plus Noise Ratio
SOC System on a Chip
SON Self-Organizing Network
SONET Synchronous Optical Networking
SRS Sounding Reference Signal
TDD Time Division Duplex
TPC Transmit Power Control
TR Technical Report
TS Technical Specification
UCI Uplink Control Information
UE User Equipment
UMa-AV Urban Macro for Aerial Vehicles
UMi-AV Urban Micro for Aerial Vehicles
UMTS Universal Mobile Telecommunications System
USB Universal Serial Bus
UTRAN Universal Terrestrial Radio Access Network
V2I Vehicle-to-Infrastructure
V2V Vehicle-to-Vehicle
V2X Vehicle-to-Everything
VMM Virtual Machine Monitor
VNE Virtual Network Element
VNF Virtual Network Function
VoIP Voice over Internet Protocol
WAN Wide Area Network
WCDMA Wideband Code Division Multiple Access
WD Wireless Device
WiMax Worldwide Interoperability for Microwave Access
WLAN Wireless Local Area Network Those skilled in the art will recognize improvements and modifications to the embodiments of the present disclosure. All such improvements and modifications are considered within the scope of the concepts disclosed herein.

REFERENCES (INCORPORATED BY REFERENCE)

3GPP Documents are Publicly Available at 21w.3gpp.org
[1] 3GPP TR 36.777 V0.3.0, Study on Enhanced LTE support for Aerial Vehicles (Release 15)
[2] 3GPP TS 36.213 V14.3.0, Section 5.1, "Uplink power control"
[3] 3GPP TS 36.213, Section 6.1, "Physical non-synchronized random access procedure"
[4] R1-1713889, "Initial views on interference mitigation schemes for aerials", NTT DOCOMO, 3GPP RAN1 #90, Prague, Czechia, 21-25 Aug. 2017
[5] R1-1714466, "Potential enhancements on interference mitigation", ZTE, 3GPP RAN1 #90, Prague, Czechia, 21-25 Aug. 2017
[6] R1-1708813, "System level performance and interference mitigation techniques for aerial vehicles" Qualcomm Incorporated, 3GPP RAN1 #89, Hangzhou, P. R. China 15-19 May 2017
[7] U.S. Application No. 62/565,977, "DYNAMIC UPLINK TARGET RECEIVE POWER ADJUSTMENT FOR UPLINK INTERFERENCE MITIGATION"

What is claimed is:

1. A method performed by a wireless device for fast uplink power control, the method comprising:
receiving a transmit power control command from a network node;
determining one of two or more predefined transmit power control mapping tables to be used by the wireless device to interpret the transmit power control command;
determining a power adjustment value based on the transmit power control command received from the network node using the one of the two or more predefined transmit power control mapping tables; and
adjusting a transmit power of the wireless device based on the power adjustment value;
wherein:
the two or more predefined transmit power control mapping tables comprise a first transmit power control mapping table and a second transmit power control mapping table that is different than the first transmit power control mapping table; and
the first transmit power control mapping table is an existing table defined in Third Generation Partnership Project, 3GPP, Long Term Evolution, LTE, and the second transmit power control mapping table is a new table.

2. The method of claim 1 further comprising transmitting an uplink transmission using the adjusted transmit power.

3. The method of claim 1 further comprising:
receiving, from the network node, an indication of the one of the two or more predefined transmit power control mapping tables to be used by the wireless device;
wherein determining the one of the two or more predefined transmit power control mapping tables to be used by the wireless device comprises determining the one of the two or more predefined transmit power control mapping tables to be used by the wireless device based on the indication received from the network node.

4. The method of claim 1 wherein determining the one of the two or more predefined transmit power control mapping tables to be used by the wireless device comprises determining, at the wireless device, the one of the two or more predefined transmit power control mapping tables to be used by the wireless device based on one or more predefined criteria.

5. The method of claim 4 wherein the one or more predefined criteria comprise a criterion related to a height of the wireless device.

6. The method of claim 4 wherein the one or more predefined criteria comprise a criterion based on:
a Reference Signal Received Power, RSRP, of a serving cell of the wireless device and a RSRP of one or more neighboring cells of the wireless device; and/or
Reference Signal Received Quality, RSRQ; and/or
Received Signal Strength Indicator, RSSI.

7. The method of claim 1 further comprising:
receiving one or more criteria from the network node;
wherein determining the one of the two or more predefined transmit power control mapping tables to be used by the wireless device comprises determining the one of the two or more predefined transmit power control mapping tables to be used by the wireless device based on the one or more criteria received from the network node.

8. The method of claim 1, wherein the first transmit power control mapping table and the second transmit power control mapping table have a same number of entries.

9. The method of claim 8 wherein:
the first transmit power control mapping table has four entries corresponding to four different power adjustment values defined by the first transmit power control mapping table; and
the second transmit power control mapping table has four entries corresponding to four different power adjustment values defined by the second transmit power control mapping table, at least one of which is greater than all of the four different power adjustment values defined by the first transmit power control mapping table.

10. The method of claim 8 wherein:
the first transmit power control mapping table has four entries corresponding to four different power adjustment values defined by the first transmit power control mapping table; and
the second transmit power control mapping table has four entries corresponding to four different power adjustment values defined by the second transmit power control mapping table, at least one of which is less than all of the four different power adjustment values defined by the first transmit power control mapping table.

11. The method of claim 1, wherein the first transmit power control mapping table has a first number of entries and the second transmit power control mapping table has a second number of entries that is not equal to the first number of entries.

12. The method of claim 11 wherein:
the first transmit power control mapping table has four entries corresponding to four different power adjustment values defined by the first transmit power control mapping table; and
the second transmit power control mapping table has eight entries corresponding to eight different power adjustment values defined by the second transmit power control mapping table, at least one of which is greater than all of the four different power adjustment values defined by the first transmit power control mapping table.

13. The method of claim 11 wherein:
the first transmit power control mapping table has four entries corresponding to four different power adjustment values defined by the first transmit power control mapping table; and
the second transmit power control mapping table has eight entries corresponding to eight different power adjustment values defined by the second transmit power control mapping table, at least one of which is less than all of the four different power adjustment values defined by the first transmit power control mapping table.

14. The method of claim 11 wherein the first transmit power control mapping table is a subset of the second transmit power control mapping table.

15. The method of claim 1 wherein the two or more predefined transmit power control mapping tables define accumulated power adjustment values.

16. The method of claim 1 wherein the two or more predefined transmit power control mapping tables define non-accumulated power adjustment values.

17. The method of claim 1 wherein receiving the transmit power control command from the network node comprises receiving, from the network node, downlink control information comprising the transmit power control command.

18. The method of claim 17 wherein a pathloss compensation factor is jointly indicated with the power adjustment value using the same field in the downlink control information.

19. The method of claim 1, further comprising:
providing user data; and
forwarding the user data to a host computer via a transmission to the network node using the adjusted transmit power.

20. A wireless device for fast uplink power control, the wireless device comprising:
an interface; and
processing circuitry configured to cause the wireless device to:
receive a transmit power control command from a network node;
determine one of two or more predefined transmit power control mapping tables to be used by the wireless device to interpret the transmit power control command;
determine a power adjustment value based on the transmit power control command received from the network node using the one of the two or more predefined transmit power control mapping tables; and
adjust a transmit power of the wireless device based on the power adjustment value;
wherein:
the two or more predefined transmit power control mapping tables comprise a first transmit power control mapping table and a second transmit power control mapping table that is different than the first transmit power control mapping table; and
the first transmit power control mapping table is an existing table defined in Third Generation Partnership Project, 3GPP, Long Term Evolution, LTE, and the second transmit power control mapping table is a new table.

21. A method performed by a network node to provide fast uplink power control, the method comprising:
signaling, from the network node to a wireless device:
an indication of one of two or more predefined transmit power control mapping tables to be used by the wireless device; or
one or more criteria to be used by the wireless device to select the one of the two or more predefined mapping tables to be used by the wireless device; and
sending, from the network node to the wireless device, a transmit power control command to be mapped to a power adjustment value by the wireless device using the one of the two or more predefined transmit power control mapping tables;
wherein:
the two or more predefined transmit power control mapping tables comprise a first transmit power control mapping table and a second transmit power control mapping table that is different than the first transmit power control mapping table; and
the first transmit power control mapping table is an existing table defined in Third Generation Partnership Project, 3GPP, Long Term Evolution, LTE, and the second transmit power control mapping table is a new table.

22. The method of claim 21 wherein signaling the indication of the one of the two or more predefined transmit power control mapping tables to be used by the wireless device or the one or more criteria to be used by the wireless device to select the one of the two or more predefined mapping tables to be used by the wireless device comprises:
signaling, from the network node to the wireless device, the indication of the one of the two or more predefined transmit power control mapping tables to be used by the wireless device.

23. The method of claim 21 wherein signaling the indication of the one of the two or more predefined transmit power control mapping tables to be used by the wireless device or the one or more criteria to be used by the wireless device to select the one of the two or more predefined mapping tables to be used by the wireless device comprises:
signaling, from the network node to the wireless device, the one or more criteria to be used by the wireless device to select the one of the two or more predefined transmit power control mapping tables.

24. The method of claim 21, wherein the first transmit power control mapping table and the second transmit power control mapping table have a same number of entries.

25. The method of claim 24 wherein:
the first transmit power control mapping table has four entries corresponding to four different power adjustment values defined by the first transmit power control mapping table; and
the second transmit power control mapping table has four entries corresponding to four different power adjustment values defined by the second transmit power control mapping table, at least one of which is greater than all of the four different power adjustment values defined by the first transmit power control mapping table.

26. The method of claim 24 wherein:
the first transmit power control mapping table has four entries corresponding to four different power adjustment values defined by the first transmit power control mapping table; and
the second transmit power control mapping table has four entries corresponding to four different power adjustment values defined by the second transmit power control mapping table, at least one of which is less than all of the four different power adjustment values defined by the first transmit power control mapping table.

27. The method of claim 21, wherein the first transmit power control mapping table has a first number of entries and the second transmit power control mapping table has a second number of entries that is not equal to the first number of entries.

28. The method of claim 27 wherein:
the first transmit power control mapping table has four entries corresponding to four different power adjustment values defined by the first transmit power control mapping table; and
the second transmit power control mapping table has eight entries corresponding to eight different power adjustment values defined by the second transmit power control mapping table, at least one of which is greater than all of the four different power adjustment values defined by the first transmit power control mapping table.

29. The method of claim 27 wherein:
the first transmit power control mapping table has four entries corresponding to four different power adjustment values defined by the first transmit power control mapping table; and
the second transmit power control mapping table has eight entries corresponding to eight different power adjustment values defined by the second transmit power control mapping table, at least one of which is less than all of the four different power adjustment values defined by the first transmit power control mapping table.

30. The method of claim 27 wherein the first transmit power control mapping table is a subset of the second transmit power control mapping table.

31. The method of claim 21 wherein the two or more predefined transmit power control mapping tables define accumulated power adjustment values.

32. The method of claim 21 wherein the two or more predefined transmit power control mapping tables define non-accumulated power adjustment values.

33. The method of claim 21 wherein sending the transmit power control command comprises sending, from the network node to the wireless device, downlink control information comprising the transmit power control command.

34. The method of claim 33 wherein a pathloss compensation factor is jointly indicated with the power adjustment value using the same field in the downlink control information.

35. The method of claim 21, further comprising:
obtaining user data; and
forwarding the user data to a host computer or a wireless device.

36. A network node for fast uplink power control, the network node comprising:
an interface; and
processing circuitry configured to cause the network node to:
signal, from the network node to a wireless device:
an indication of one of two or more predefined transmit power control mapping tables to be used by the wireless device; or
one or more criteria to be used by the wireless device to select the one of the two or more predefined mapping tables to be used by the wireless device; and
send, from the network node to the wireless device, a transmit power control command to be mapped to a power adjustment value by the wireless device using the one of the two or more predefined transmit power control mapping tables;
wherein:
the two or more predefined transmit power control mapping tables comprise a first transmit power control mapping table and a second transmit power control mapping table that is different than the first transmit power control mapping table; and
the first transmit power control mapping table is an existing table defined in Third Generation Partnership Project, 3GPP, Long Term Evolution, LTE, and the second transmit power control mapping table is a new table.

* * * * *